US011126672B2

(12) United States Patent
Sathish

(10) Patent No.: US 11,126,672 B2
(45) Date of Patent: Sep. 21, 2021

(54) METHOD AND APPARATUS FOR MANAGING NAVIGATION OF WEB CONTENT

(71) Applicant: SAMSUNG ELECTRONICS CO., LTD., Suwon-si (KR)

(72) Inventor: Sailesh Kumar Sathish, Kamataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 346 days.

(21) Appl. No.: 16/216,216

(22) Filed: Dec. 11, 2018

(65) Prior Publication Data
US 2019/0179859 A1 Jun. 13, 2019

(30) Foreign Application Priority Data
Dec. 11, 2017 (IN) .............................. 201741044458

(51) Int. Cl.
*G06F 17/30* (2006.01)
*G06F 16/951* (2019.01)
*G06F 16/957* (2019.01)
*G06F 16/954* (2019.01)

(52) U.S. Cl.
CPC .......... *G06F 16/951* (2019.01); *G06F 16/954* (2019.01); *G06F 16/9577* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| 10,430,067 | B2* | 10/2019 | Patel ..................... G06F 3/0484 |
| 10,809,956 | B1* | 10/2020 | Bragdon .................. G06F 3/14 |
| 2009/0204639 | A1* | 8/2009 | Barrett ............... H04N 21/4425 |
| 2012/0260161 | A1* | 10/2012 | Ishigami ............... G06F 16/954 |
| | | | 715/234 |
| 2014/0082533 | A1* | 3/2014 | Kelley .................. G06F 3/0488 |
| | | | 715/764 |
| 2014/0229467 | A1 | 8/2014 | Roseman et al. |
| 2014/0372563 | A1* | 12/2014 | Ke ........................ G06F 16/335 |
| | | | 709/218 |
| 2015/0019341 | A1 | 1/2015 | Pasila et al. |
| 2016/0004779 | A1 | 1/2016 | Sathish et al. |
| 2016/0179318 | A1* | 6/2016 | Patel .................... H04N 21/482 |
| | | | 715/765 |

(Continued)

FOREIGN PATENT DOCUMENTS

WO 2014/105991 A1 7/2014

OTHER PUBLICATIONS

International Search Report dated Mar. 8, 2019 issued by the International Searching Authority in counterpart International Application No. PCT/KR2018/015627 (PCT/ISA/210).
(Continued)

*Primary Examiner* — Hung D Le
(74) *Attorney, Agent, or Firm* — Sughrue Mion, PLLC

(57) ABSTRACT

A method for managing navigation of web content by displaying an indicia on a first content on a screen of the electronic device, the indicia indicating an availability of a second content related to the first content, detecting an input on at least one portion of the first content, and displaying the second content related to the at least one portion of the first content on the screen.

18 Claims, 21 Drawing Sheets

(56) References Cited

U.S. PATENT DOCUMENTS

| | | |
|---|---|---|
| 2016/0259859 A1 | 9/2016 | Sathish et al. |
| 2017/0046523 A1 | 2/2017 | Sathish et al. |
| 2017/0094360 A1* | 3/2017 | Keighran ........... H04N 21/4758 |
| 2017/0195437 A1 | 7/2017 | Venkataramana et al. |
| 2017/0344240 A1 | 11/2017 | Billgren et al. |

OTHER PUBLICATIONS

Written Opinion dated Mar. 8, 2019 issued by the International Searching Authority in counterpart International Application No. PCT/KR2018/015627 (PCT/ISA/237).

Communication dated Sep. 16, 2020 issued by the European Patent Office in European Application No. 18889524.7.

Samur Araujo et al., "Linkator: Enriching Web Pages by Automatically Adding Dereferenceable Semantic Annotations", ICWE, Annual International Conference on the Theory and Applications of Cryptographic Techniques, ISBN: 978-3-642-17318-9, Jul. 5, 2010, pp. 355-369, 15 pages total, XP047404496.

\* cited by examiner

METHOD AND APPARATUS FOR MANAGING NAVIGATION OF WEB CONTENT

CROSS-REFERENCE TO RELATED APPLICATION(S)

This application is based on and claims priority under 35 U.S.C. § 119(a) from Indian Patent Application No. 201741044458, filed on Dec. 11, 2017, in the Indian Patent Office, the disclosure of which is incorporated by reference herein in its entirely.

BACKGROUND

1. Field

The disclosure relates to content management, and more particularly to a method and apparatus for managing navigation of web content.

2. Description of Related Art

In general, a search engine (i.e., Internet browser) of an electronic device provides an interface through which a user of the electronic device can provide navigate and explore the Internet to view information hosted by Internet web pages. The information provided by a web page is associated with a location or address (i.e., uniform resource locator (URL)) by which the user may access the web page or resources. However, if the user wants to explore an additional piece of information while viewing currently browsed information, then the user should access a different web page, possibly discovered a the search engine, at which the additional content is associated, and then access that additional content with another URL. Thus, limiting the user experience thereto.

For example, a browser of an electronic device currently displays a web page including a plurality of topics associated therewith. If the user wishes to explore additional information related to one of the topics, then the user can perform an additional search.

For example, the user may manually search for the contents associated with one of the topics in the web page of an Internet browser. Thus, the user needs to navigate between multiple web pages in order to find the related content for one of the topics. Further, the user should have knowledge about websites and/or search engines, such as how to appropriately use the search engine to find the related content for one of the topics. This results in unsatisfying browsing experience for the user.

Thus, it is desired to address the above-mentioned disadvantages or other shortcomings to at least provide a useful alternative.

SUMMARY

Embodiments herein provide a method and apparatus for managing navigation of web content.

Embodiments herein provide a method for displaying an indicia on a first content browsed in an electronic device, the indicia indicating an availability of at least one second content contextually related to the first content.

Embodiments herein provide a method for determining the second content hidden behind at least one portion of the first content browsed in the electronic device.

Embodiments herein provide a method for recognizing semantics associated with at least one portion of the first content.

Embodiments herein provide a method for determining the second content corresponding to at least one portion of the first content based on the semantics.

Embodiments herein provide a method for generating a list including at least one identifier of at least one second content.

Embodiments herein provide a method for replacing at least one portion of the first content on a screen of the electronic device with the second content.

According to an aspect of an embodiment, there is provided a method for managing navigation of web content. The method includes causing, by an electronic device, to display an indicia on at least one portion of first content on a screen of the electronic device, wherein the indicia indicates an availability of a second content related to the at least one portion of the first content. Further, the method includes detecting, by the electronic device, a gesture performed on at least one portion of the first content. Furthermore, the method includes displaying, by the electronic device, the second content on the screen.

In an embodiment, detecting another gesture performed on the second content and replacing the at least one portion of the first content on the screen of the electronic device with the second content.

In an embodiment, the second content is rich content over content available at the at least one portion of the first content.

In an embodiment, the second content is hidden behind the at least one portion of the first content.

In an embodiment, the second content is displayed at the at least one portion of the first content along with remaining portions of the first content.

In an embodiment, where the second content corresponding to the at least one portion of the first content is dynamically determined by recognizing semantics associated with the at least one portion the first content and determining the second content corresponding to the at least one portion of the first content based on the semantics.

In an embodiment, the second content is determined from a list including at least one identifier of the second content.

In an embodiment, the first content is scrollable along a first direction and configuring the second content along a second direction.

In an embodiment, the first direction and the second direction are substantially perpendicular to each other.

In an embodiment, the second content includes a primary content and a secondary content, where the primary content is related to the at least one portion of the first content and the secondary content is related to the primary content.

In an embodiment, the secondary content is dynamically updated based on semantics associated with the primary content and the primary content browsed by a user on the primary content.

In an embodiment, the first content is associated with a web page, where the user automatically navigates to the second content within the web page of the first content.

According to an aspect of an embodiment, there is provided a method for managing navigation of web content. The method includes receiving, by an apparatus, an identifier of at least one portion of first content from an electronic device. Further, the method includes second content related to the at least one portion of the first content. Furthermore, the method includes generating, by the apparatus, a list including at least one identifier of the at least one second content and sending, by the apparatus, the list to the electronic device.

In an embodiment, generating the list including at least one identifier of the at least one second content includes detecting predefined identifiers associated with the at least one portion of the first content. Further, generating the list including at least one identifier of the at least one second content includes determining the at least one identifier for the second content based on the semantics. Furthermore, generating the list including at least one identifier of the at least one second content includes generating an index of web pages associated with the at least one identifier of the second content, where the index includes the predefined identifiers and the at least one identifier for the second content and generating the list based on the index.

According to an aspect of an embodiment, there is provided an electronic device for managing navigation of web content. The electronic device includes a memory, a processor and a navigation engine, operably coupled to the memory and the processor. The navigation engine is configured to cause to display an indicia on at least one portion of first content browsed in the electronic device, where the indicia indicates an availability of a second content contextually related to the at least one portion of the first content. Further, the navigation engine is configured to detect a gesture performed on at least one portion of the first content. Furthermore, the navigation engine is configured to replace the at least one portion of the first content on a screen of the electronic device with the second content.

According to an aspect of an embodiment, there is provided an apparatus for managing navigation of web content. The apparatus includes a memory, a processor and a navigation engine, operably coupled to the memory and the processor. The navigation engine is configured to receive an identifier of at least one portion of first content from an electronic device. Further, the navigation engine is configured to determine second content related to the at least one portion of the first content. Furthermore, the navigation engine is configured to generate a list including at least one identifier of the second content and send the list to the electronic device.

According to an aspect of an embodiment, there is provided a method for managing navigation of web content. The method includes detecting, by an electronic device, a gesture performed on at least one portion of a first content. Further the method includes determining, by electronic device, a second content hidden behind the at least one portion of the first content, wherein the second content is contextually related to a first content. Furthermore, the method includes replacing, by the electronic device, the at least one portion of the first content on a screen of the electronic device with the second content.

According to an aspect of an embodiment, there is provided an apparatus for managing navigation of web content. The apparatus includes a memory, a processor and a navigation engine, operably coupled to the memory and the processor. The navigation engine is configured to detect, by an electronic device, a gesture performed on at least one portion of a first content. Further, the navigation engine is configured to determine, by electronic device, a second content hidden behind the at least one portion of the first content, wherein the second content is contextually related to a first content. Furthermore, the navigation engine is configured to replace, by the electronic device, the at least one portion of the first content on a screen of the electronic device with the second content.

The above and other aspects will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The embodiments herein will be better understood from the following detailed description with reference to the drawings, in which.

DETAILED DESCRIPTION OF EMBODIMENTS

Figure 1:
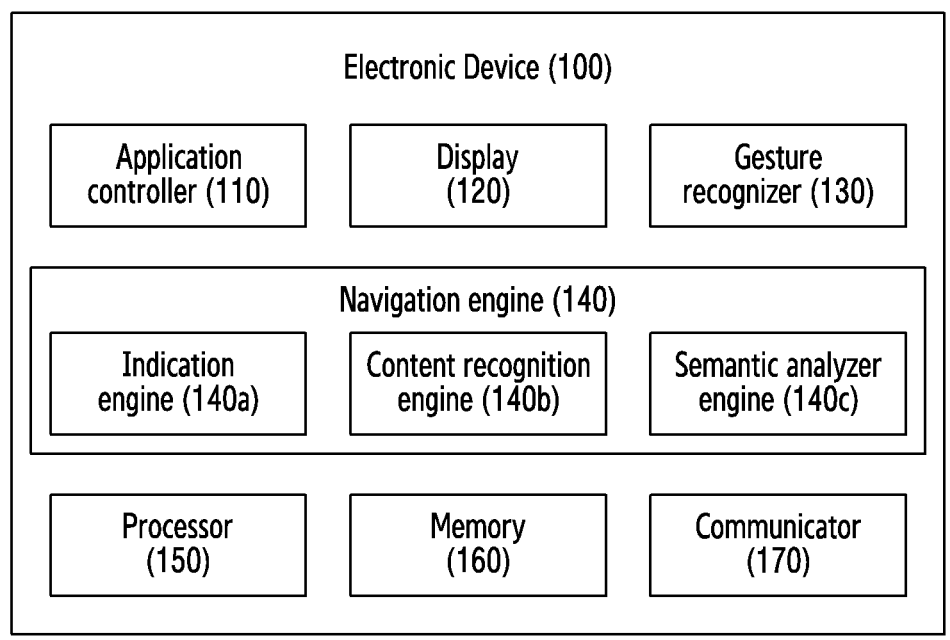
FIG. 1 is a block diagram illustrating an electronic device, according to an embodiment.

The embodiments herein and the various features and advantageous details thereof are explained more fully with reference to the non-limiting embodiments that are illustrated in the accompanying drawings and detailed in the following description. Descriptions of well-known components and processing techniques are omitted so as to avoid unnecessarily obscuring the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. Expressions such as "at least one of," when preceding a list of elements, modify the entire list of elements and do not modify the individual elements of the list. For example, the expressions "at least one of a, b, and c," "at least one of a, b, or c," and "at least one of a, b, and/or c" should be understood as including only a, only b, only c, both a and b, both a and c, both b and c, or all of a, b, and c. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As traditional in the field, embodiments may be described and illustrated in terms of blocks that carry out a described function or functions. These blocks, which may be referred to herein as units or modules or the like, may be physically implemented by analog and/or digital circuits such as logic gates, integrated circuits, microprocessors, microcontrollers, storage circuits, passive electronic components, active electronic components, optical components, hardwired circuits and the like, and may optionally be driven by firmware and/or software programmed to the components or read from associated memory and executed by the components. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The term "first" and a "second" are merely used for labeling purpose and may be used interchangeably without departing from the scope of the embodiments.

Accordingly, embodiments herein provide a method for managing navigation of web content. The method includes causing, by an electronic device, to display an indicia on a first content browsed in the electronic device, the indicia indicating an availability of a second content contextually related to the first content. Further, the method includes detecting, by the electronic device, a gesture input performed on at least one portion of the first content. Furthermore, the method includes replacing, by the electronic device, the at least one portion of the first content on a screen of the electronic device with the second content.

Unlike conventional methods and systems, the proposed method can be used to replace the at least one portion of the first content in a same web page with the second content, while the web page is currently being browsed by the browser of the electronic device. Thus, the proposed method allows the user to view the second content and the remaining portions of the first content in the web page.

For example, the browser of the electronic device 100 may display a plurality of topics (such as topic1: "medicine for cancer," topic2: "National bus strike" and topic3: "Environmental impact of food waste") in a web page. If the user wants to explore more content (i.e., second content) related to topic 1 (i.e., medicine for cancer), then according to the proposed method, the user can merely perform the gesture on topic1 (or, can perform the gesture on a particular content from the topic 1) in order to explore more content related to the content for topic1. The second content is therefore rendered by replacing the associated selected content within the same web page without altering the other topics (i.e., topic2 and topic3).

Embodiments herein provide a method for managing navigation of web content. The method includes receiving, by an apparatus, an identifier of a first content from an electronic device. Further, the method includes determining, by the apparatus, at least one second content for at least one portion of the first content. Furthermore, the method includes generating, by the apparatus, a list including at least one identifier of the at least one second content and sending the list, by the apparatus, to the electronic device.

Unlike conventional methods and systems, the proposed method can be used to generate the list from an index of web pages. The proposed method can be used to detect a pre-defined identifier associated with the first content. Further, the proposed method can be used to perform semantic analysis to determine the second content from content providers. According to various embodiments of the disclosure, a semantic analysis may be performed by the methods described in the following documents [1] US 2016/0259859 A1, [2] US 2017/0046523 A1, and [3] US 2017/0195437 A1. Furthermore, the proposed method can be used to generate the index of web pages associated with the at least one identifier of the second content, where the index comprises the predefined identifiers and the at least one identifier for the second content.

For example, a search interface of the browser of the electronic device may display the first content (e.g., news related to sports) in a web page. Further, if the user needs to explore more information related the first content, then the proposed method can be used to generate the list comprising identifiers (i.e., URL) of a plurality of second content related to the first content. The list includes the identifier associated with a primary content (e.g., Cricket) that is more related to the first content and the identifiers of secondary content (e.g., live score of a test match) that is related to the primary content, and the secondary content is updated regularly based on the primary content. This results in an enhanced browsing experience for the user.

Referring now to the drawings, and more particularly to FIG. 1 through FIG. 11, these are shown preferred embodiments.

FIG. 1 is a block diagram illustrating an electronic device 100, according to an embodiment. The electronic device 100 can be, for example, but not limited to, a mobile phone, a user equipment (UE), a smartphone, a laptop, a smart watch, a wearable device, a tablet computer, a desktop computer, personal digital assistants (PDAs), a tablet, a phablet or any other electronic device or the like.

In an embodiment, the electronic device 100 includes an application controller 110, a display 120, a gesture recognizer 130, a navigation engine 140, a processor 150, a memory 160, and a communicator 170.

The application controller 110 can be configured to control operations of a plurality of applications associated with the electronic device 100. The applications may include a browser application, a media control application, etc.

For example, the application controller 110 may be configured to enable the user to search, navigate and view various information available on the Internet. By the application controller 110, when the user inputs a request for news related information in the web page by typing keywords (such as today's news), the browser application can be configured to search for news related information by way of the Internet, and retrieves and provides the news related information in the web page of the electronic device 100.

The display 120 is configured to display content (e.g., a first content, a second content or any piece of information) on the screen of the electronic device 100. In an embodiment, the display 120 can be but is not limited to a liquid crystal display (LCD), an active matrix organic light emitting diode (AM-OLED), a light emitting diode (LED) display, or the like.

The gesture recognizer 130 can be configured to detect a gesture performed on a touch screen displaying at least one of the first content (i.e., at least one portion of the first content) or the second content (i.e., at least one portion of the second content) displayed on the web page of the browser application of the electronic device 100. The gesture includes, for example, a pinch-in gesture, a pinch-out action, a pinch-in action, a swipe gesture, a tap gesture, a long gesture, and the like.

The navigation engine 140 is coupled to the gesture recognizer 130 and the processor 150. In an embodiment, the navigation engine 140 includes an indication engine 140a, a content recognition engine 140b, and a semantic analyzer engine 140c.

The indication engine 140a is configured to provide an indicia on the first content currently browsed in the electronic device 100. For example, the indicia can be any visually displayed graphical element configured to indicate the availability of the second content associated with the first content (i.e., hidden behind the at least one portion of the first content).

In response to detecting the gesture, the semantic analyzer engine 140c can be configured to recognize semantics associated with the at least one portion of the first content.

In an embodiment, the semantics can be for example, determining one or more latent topics through use of a supervised model, or determining a set of word tokens (word vectors) corresponding to the at least one portion of the topic.

In an embodiment, the semantics can be for example, determining the word vector corresponding to the latent topic determined for at least one portion along with probability values for each word within the topic vector and/or providing a topic level distribution with topic level probabilities within the portion or an entire web page content.

Based on the semantics, the content recognition engine 140b can be configured to determine the second content corresponding to the at least one portion of the first content, the second content being contextually related to the first content. In an embodiment, the second content is determined from a list comprising at least one identifier of the second content. The list may be received from an apparatus (as explained in FIG. 2).

In an embodiment, the second content is pre-determined by the apparatus. In another embodiment, the electronic device 100 can be configured to automatically determine the list, and the list includes the identifiers of the second content.

In an embodiment, the second content includes a primary content and a secondary content, and the primary content is related to the at least one portion of the first content and the secondary content is related to the primary content.

The content recognition engine 140b can be configured to dynamically update the secondary content based on semantics associated with the primary content and the primary content browsed by the user.

In response to detecting the gesture performed on the second content, the content recognition engine 140b can be configured to replace the second content on the screen of the electronic device with the at least one portion of the first content.

The processor 150 is coupled with the memory 160 for performing navigation of web content based on executing the instructions stored in the memory 160.

The memory 160 is configured to store the instructions to be executed by the processor 150. The memory 160 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 160 may, in some examples, be considered a non-transitory storage medium. The term "non-transitory" may indicate that the storage medium is not embodied in a carrier wave or a propagated signal. However, the term "non-transitory" should not be interpreted that the memory 160 is non-movable. In some examples, the memory 160 can be configured to store larger amounts of information than the memory. In certain examples, a non-transitory storage medium may store data that can, over time, change (e.g., in random access memory (RAM) or cache).

The communicator 170 is configured to communicate with an apparatus via a network. The communicator may include a wired communication interface, such as an Ethernet interface, or a wireless communication interface including an antenna for communicating over one or more wireless protocols (WiFi, IEEE 802.x, 3G, 4G, LTE, etc.).

Although the FIG. 1 shows various hardware components of the electronic device 100 but it is to be understood that other embodiments are not limited thereon. For example, components illustrated in FIG. 1 may be coupled by one bus or a plurality thereof, for exchanging information therebetween. In other embodiments, the electronic device 100 may include greater or fewer components. Further, the labels or names of the components are used only for illustrative purposes. One or more components can be combined together to perform same or substantially similar function to perform the device-based authentication.

Figure 2:
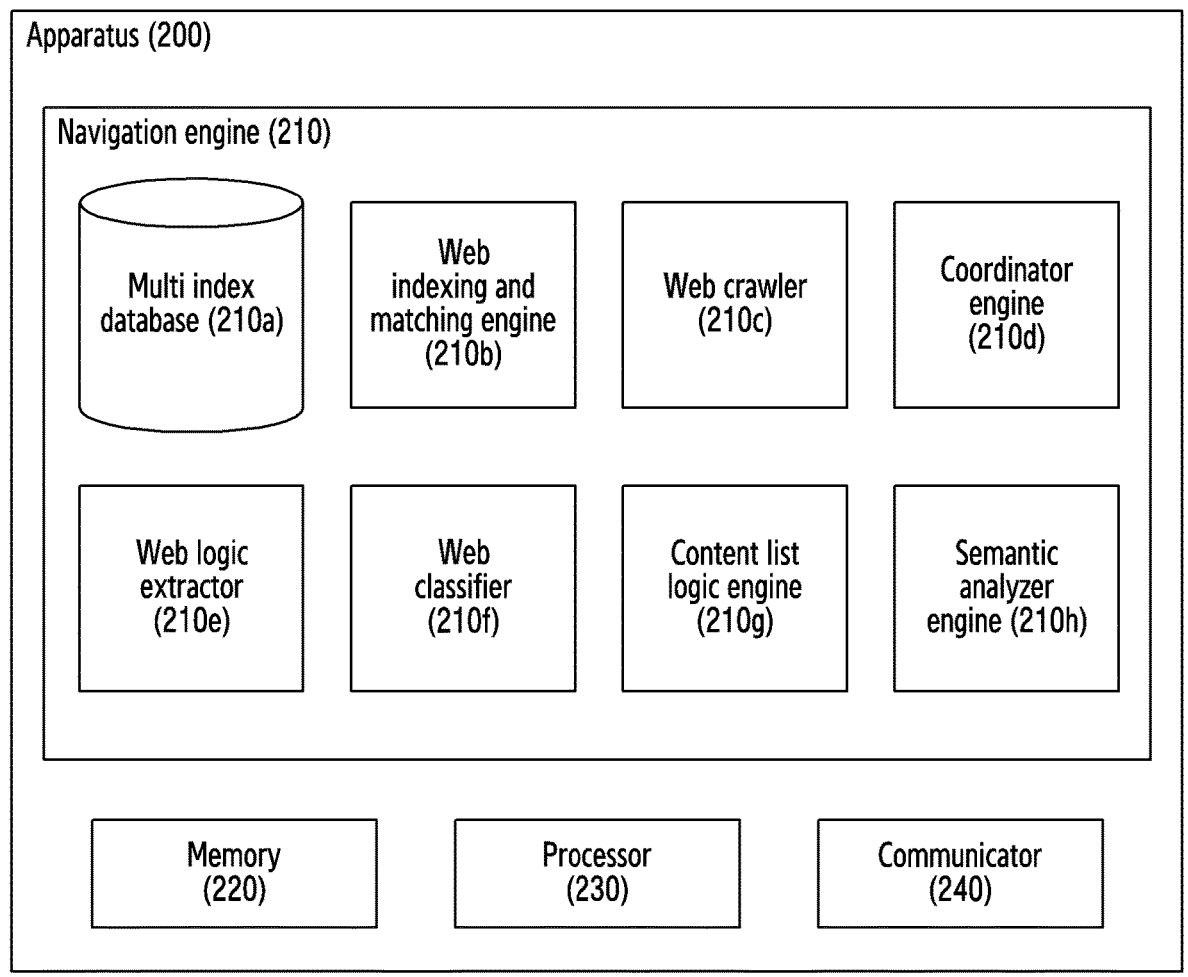
FIG. 2 is a block diagram illustrating an apparatus, according to an embodiment.

FIG. 2 is a block diagram illustrating an apparatus 200, according to an embodiment. In an embodiment, the apparatus 200 can be for example a web server. In another embodiment, the apparatus 200 can be for example another electronic device. The apparatus 200 is configured to generate and transmit the list to the electronic device 100, and the list includes the identifiers associated with the second content. In an embodiment, the identifier can be but is not limited to a uniform resource locator (URL). The apparatus 200 communicates with the electronic device 100 via the network or directly communicates via point-to-point communication or other direct communication protocol.

The apparatus 200 includes a navigation engine 210, a memory 220, a processor 230 and a communicator 240.

The navigation engine 210 includes a multi index database 210a, a web indexing and matching engine 210b, a web crawler 210c, a coordinator engine 210d, a web logic extractor 210e, a web classifier 210f, content list logic 210g, and a semantic analyzer engine 210h. The navigation engine 210 may be configured to perform the following operations to generate the list.

In conjunction with the FIG. 1, the display 120 displays the web page associated with the first content in the browser of the electronic device 100.

Once the web page is displayed, the navigation engine 210 can be configured to receive the identifier of the first content from the electronic device 100. In an embodiment, the identifier can be for example, but not limited to a URL of the web page, a topic in the web page, a context in the web page, etc.

Based on the received identifier, the web crawler 210c can be configured to extract and fetch the related content for the portion of the first content from content providers. The content providers can be, for example, but not limited to, an information source, third party sources such as You-tube, Wikipedia or the like, a friend's electronic device, an expert's electronic device, a group's electronic device. The web crawler 210c can be configured to crawl the web at regular intervals, analyze web pages, fetch a plurality of second contents from the content providers and associate the plurality of second content with the at least one portion of the first content. The second content includes video URLs, metadata (such as user likes, date of creation, number of content shares, playlist, channel information, number of views, etc.) or the like.

The plurality of second content is stored in the multi index database 210a. In an embodiment, the multi index database 210a maintains an index of web pages. In some embodiments, the user may load the URL that may not have been pre-indexed in the multi-index database 210a. Hence, the web crawler 210c will fetch the plurality of the second content from the content providers in the real time.

Further, the plurality of the second contents are processed through pre-processing stages (such as lemmatization, stemming, etc.), and then the web page along with the plurality of fetched second contents are stored in the multi-index database 210a.

The web classifier 210f is configured to classify the web page based on pre-defined classes, while the web page is currently browsed in the electronic device 100. In an embodiment, the web classifier 210f can be configured to separately classify each portion of the web page. In an embodiment, the pre-defined classifications can be, for example, but are not limited to, entertainment, education, sports, politics, etc. The web classifier 210f may employ different technologies for classification such as latent Dirichlet allocation based, naïve bayes based, decision trees, neural networks, etc.

After classifying the web page, the web logic extractor 210e is configured to extract specific tokens for the classified portions, the tokens defining the topic for that portion. The tokens are similar to search tokens that readily identify the portion as well as the topic belonging to that portion. These data are then added to the multi index database 210a.

The web indexing and matching engine 210b is configured to extract key tokens from the second contents (e.g., video, images etc.). The tokens are then used to index the second content along with other metadata (such as date, time, media class etc.) within the multi index database 210a.

Further, the web indexing and matching engine 210b is configured to generate the list including an indexed second contents. Based on the classification of the web page, the web indexing and matching engine 210b can request the content list logic engine 210g to provide a schema style for that web page class.

In response to the request from the web indexing and match engine 210b, the content list logic engine 210g may provide the schema style for that particular web page class. In an embodiment, the schema style is an ordering logic for a particular class. In an embodiment, the logic is at least one of comet logic, You Tube links logic, proprietary logic, mixed similarity media from partners, collaborative logic, and personalization-based logic. Once the schema style is obtained, the web indexing and match module 210b is configured to create the list in accordance with the logic defined for that class within the schema.

For example, if the web page provides the information related to an entertainment program then, the web indexing and match module 210b can be configured to create the list including identifiers of the plurality of the second content, and the identifiers are ordered based on the media providers. If the web page is providing the information related to an education program, the web indexing and match module 210b can be configured to create the list including identifiers of the plurality of the second content, the identifiers being ordered based on educational sources. In an embodiment, the web indexing and match module 210b can create the list by ordering the plurality of second content based on parameters such as a popularity, a number of likes, a number of views, etc. as given in equation (1). A metric score is assigned for each of the second content based on the parameters. Further, the web indexing and match module 210b is configured to create the list based on descending order of the metric score of the second content.

$$\text{Metric Score} = w_{aged\_like} * \frac{(\#likes)}{upload\_time} + w_{comments} * \text{normalized}(\text{comment values}) + \\ w_{like\_rate} * \frac{(\#likes)}{\log(\#views) \text{ or normalised}(\#views)} + \\ w_{comments} * wilsonScore(\#like) \text{ or } laplacianAverage(\#likes) \quad (1)$$

Herein, Metric Score denotes a value according to a degree of association between the second content and the first content, waged_like denotes a weight value for the time lapse of 'likes' added to the second content, #likes denotes the number of 'likes' added to the second content, upload_time denotes the elapsed time since the second content was uploaded, wcomments denotes a weight value for the comments for the second content, comment values denotes a value determined by sentiment expressed within comments, the number of words in comments and the number of likes/dislikes added to comments, wlike_rate denotes a weight value determined by considering a ratio of the number of views and the number of likes for the second content, #views denotes the number of times that the second content was played.

In an embodiment, the second content pertaining to the list can be fetched from the multi index database 210a, and the second contents are already pre-indexed in the multi index database 210a. The list for each web page with indexed second content can be available within the index of the multi index database 210a. In addition, a reverse process of indexing the second content with the web page (rather than web page with second content) can be performed, if the second content within the list does not have associated web pages.

The coordinator engine 210d is configured to maintain the entire coordination, timing and scheduling of the list creation process.

The processor 230 is coupled with the memory 220 for performing list generation based on executing the instructions stored in the memory 220.

The memory 220 is configured to store the instructions to be executed by the processor 230. The memory 220 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 220 may, in some examples, be considered a non-transitory storage medium. The term "non-transitory" may indicate that the storage medium is not embodied in a carrier wave or a propagated signal. However, the term "non-transitory" should not be interpreted that the memory 220 is non-movable. In some examples, the memory 220 can be configured to store larger amounts of information than the memory. In certain examples, a non-transitory storage medium may store data that can, over time, change (e.g., in random access memory (RAM) or cache).

The communicator 240 is configured to communicate with the electronic device 100 via the network.

Although the FIG. 2 shows various hardware components of the apparatus 200, it is to be understood that other embodiments are not limited thereon. For example, components illustrated in FIG. 2 may be coupled by one bus or a plurality thereof, for exchanging information therebetween. In other embodiments, the apparatus 200 may include greater or fewer components. Further, the labels or names of the components are used only for illustrative purposes. One or more components can be combined together to perform same or substantially similar function to perform the device-based authentication.

Figure 3A:
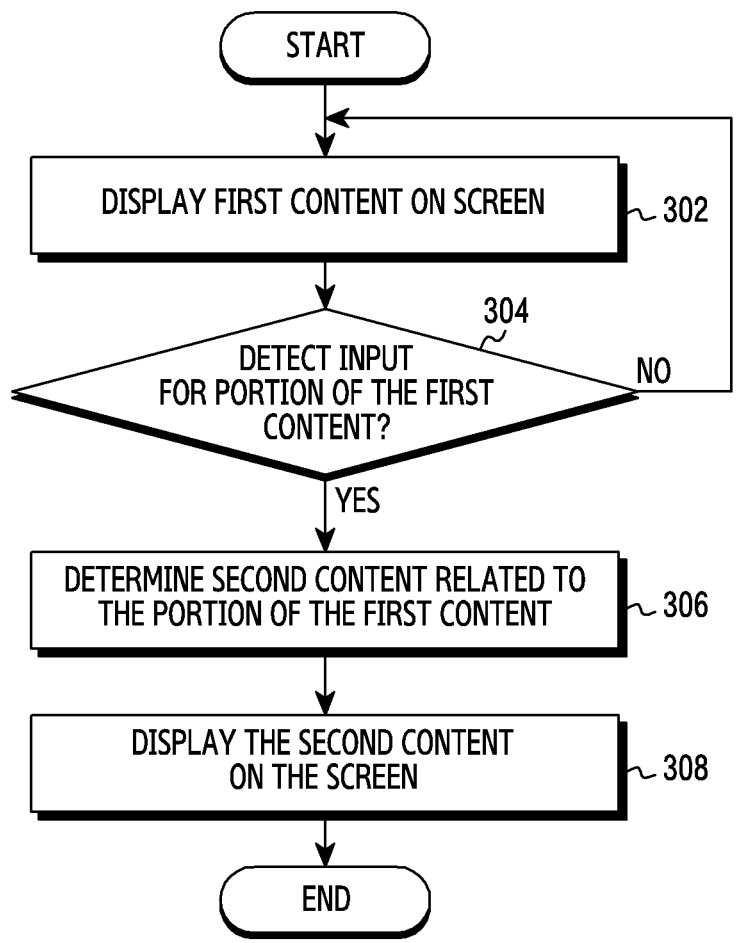
FIG. 3A is a flow chart illustrating a method of operating an electronic device, according to an embodiment.

FIG. 3A is a flow chart illustrating a method of operating an electronic device, according to an embodiment of the disclosure.

Figure 3B:
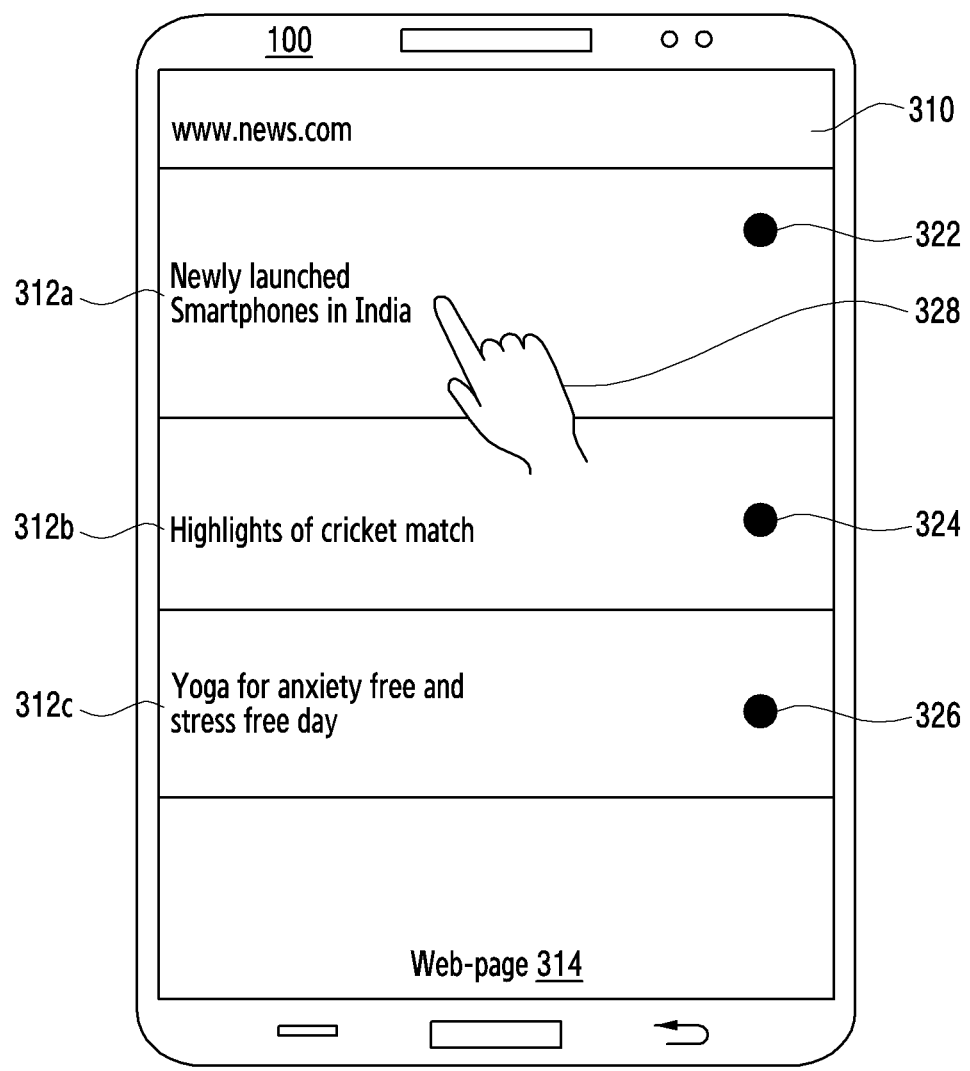
FIGS. 3B and 3C illustrate an example scenario in which a user browses for information using a search interface of a browser associated with the electronic device, according to an embodiment.

At operation 302, the electronic device 100 may display the first content on a screen of the electronic device 100. Referring to FIG. 3B, the browser of the electronic device 100 displays the web page 314 including a plurality of topics 312a-312c associated therewith. The topic 312a can be "Newly launched Smartphones in India," topic 312b can be "Highlights of cricket match" and the topic 312c can be "Yoga for anxiety free and stress free day."

According to various embodiments of the disclosure, at least one indication (i.e., at least one of a plurality of indicia 322, 324 or 326) may be displayed for indicating the availability of the second content for each of the topics 312a-312c currently displayed on the web page 314. The at least one indication may be displayed to indicate that at least one second content associated with at least one portion of the first content is hidden behind the at least one portion of the first content.

Figure 3C:
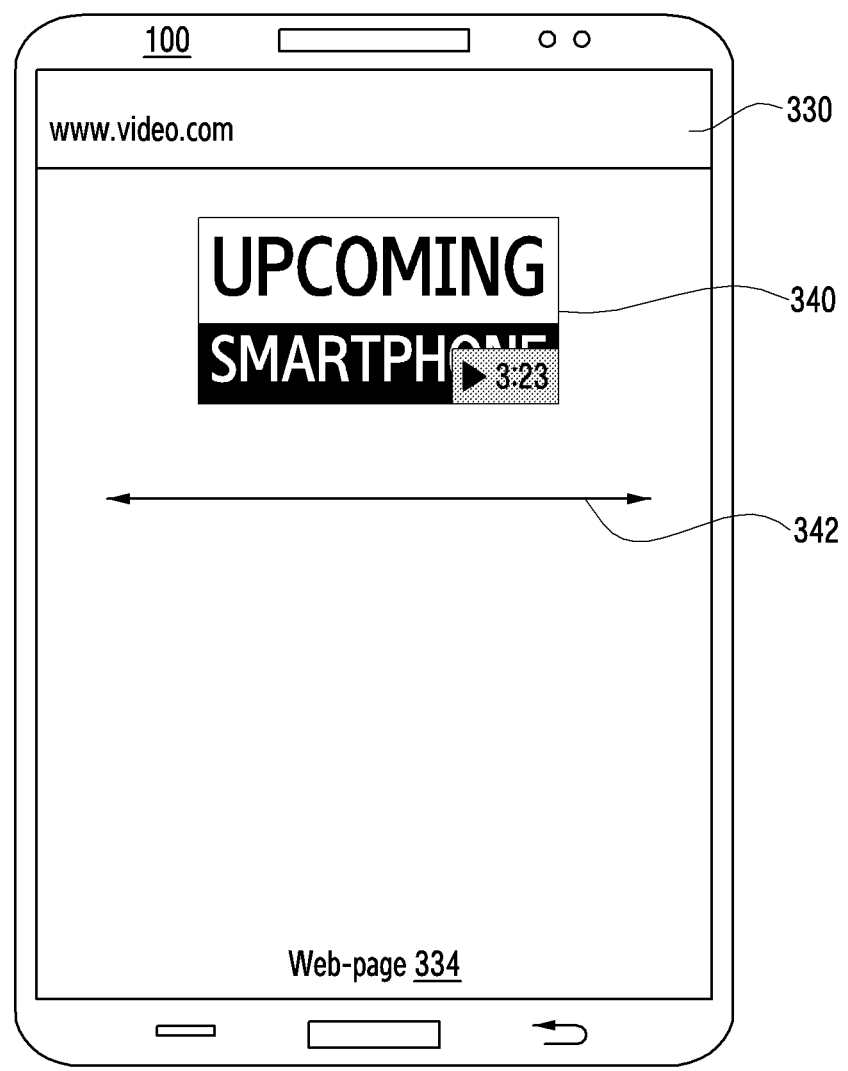

At operation 304, the electronic device 100 may be configured to detect an input selecting a portion of the first content. Referring to FIG. 3A, if no input is detected for any portion of the first content, operation 302 may be performed. If an input is detected for at least one portion of the first content, operation 306 may be performed. Referring to FIGS. 3B and 3C, if the indicia 322 is displayed near the topic 312a, the user may perform a gesture 328 on the topic 312a to indicate selection thereof with respect to the first content. The gesture 328 may be detected by the electronic device 100 as the input to switch to the screen to displaying the at least one second content comprising a video content 340 associated with the topic 312a. According to various embodiments of the disclosure, the gesture 328 includes a pinch-in gesture, a pinch-out action, a pinch-in action, a swipe gesture, a tap gesture, a long gesture, and the like.

According to various embodiments of the disclosure, in response to detecting an input corresponding to the gesture for the first content, the electronic device 100 may be configured to display at least one keyword associated with the first content. The electronic device 100 may be configured to detect an input corresponding to an input for one keyword or a combination of a plurality of keywords. In this case, the electronic device 100 may be configured to determine a second content to be displayed on the screen, based on at least one keyword selected by the gesture.

At operation 306, the electronic device 100 may be configured to determine the second content related to the portion of the first content. According to various embodiments of the disclosure, the electronic device 100 may be configured to determine the second content based on semantics of the portion of the first content. Referring to FIGS. 3B and 3C, the electronic device 100 determines the at least one second content comprising the video content 340.

According to an embodiment of the disclosure, the electronic device 100 may be configured to determine to display the second content as ordered in the list received from the apparatus 200. According another embodiment, the electronic device 100 may be further configured to determine the second content to be displayed on the screen, by performing at least one further processing on the list received from the apparatus 200.

At operation 308, the electronic device 100 may be configured to display the second content on the screen. Referring to FIG. 3C, when the at least one second content to be displayed by the electronic device 100 is determined, the video content 340 which is determined to be most related to the topic 312a is displayed on a web page 334. According to various embodiments of the disclosure, a gesture may be performed as an input to review the at least one second content. For example, a scrolling in a direction 342 (e.g., a horizontal scrolling) may be performed as the input to review the second content other than the video content 340. In this case, the second content other than the video content 340 may be provided as URL.

Figure 4A:
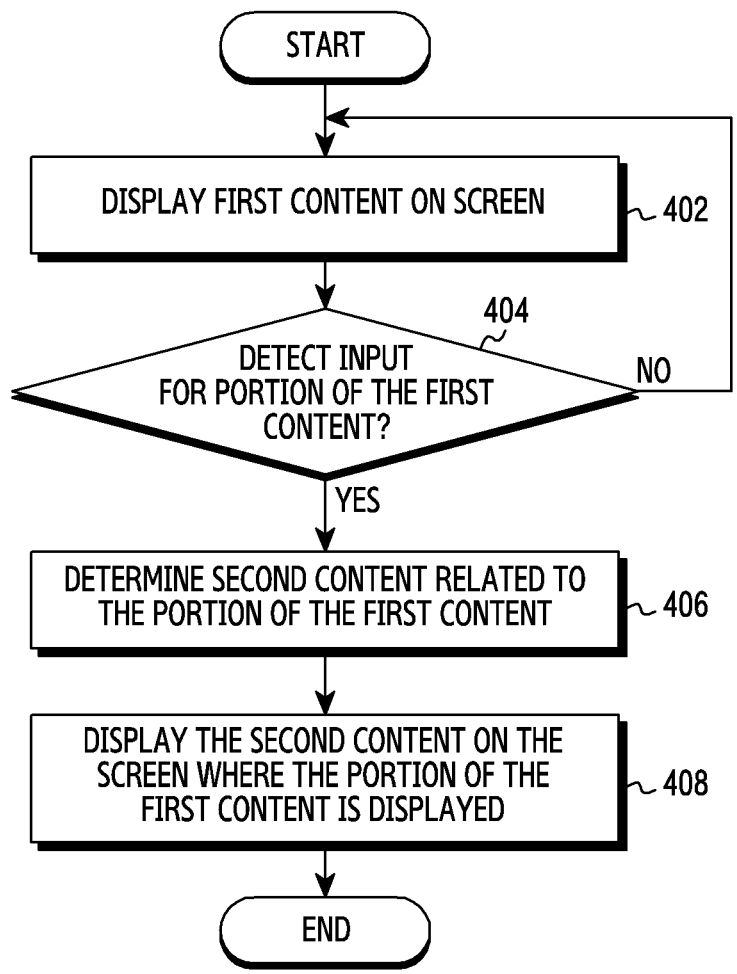
FIG. 4A is a flow chart illustrating a method of operating an electronic device, according to an embodiment.

FIG. 4A is a flow chart illustrating a method of operating an electronic device, according to an embodiment of the disclosure.

Figure 4B:
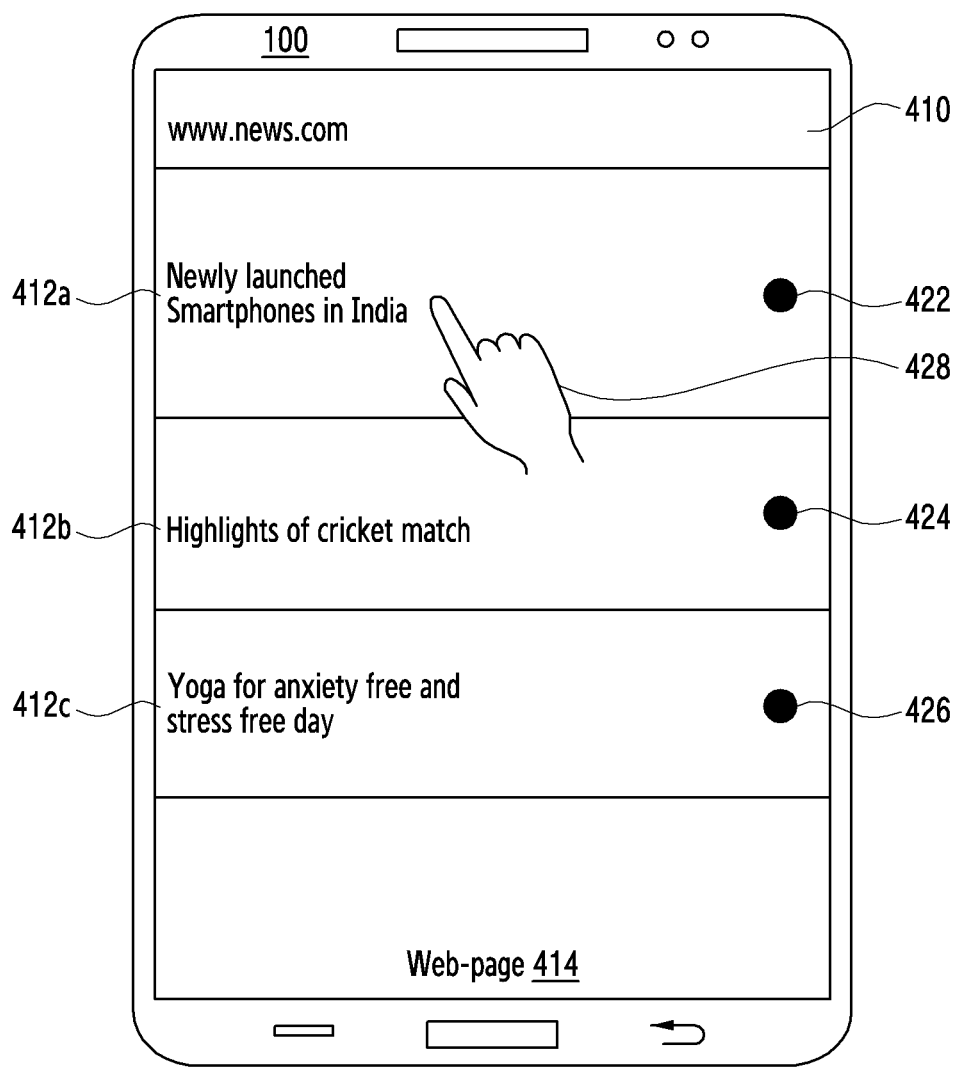
FIGS. 4B and 4C illustrate an example scenario in which a user browses for information using a search interface of a browser associated with the electronic device, according to an embodiment.

At operation 402, the electronic device 100 may display the first content on a screen of the electronic device 100. Referring to FIG. 4B, the browser of the electronic device 100 displays the web page 414 including a plurality of topics 412a-412c associated therewith. The topic 412a can be "Newly launched Smartphones in India," topic 412b can be "Highlights of cricket match" and the topic 412c can be "Yoga for anxiety free and stress free day."

According to various embodiments, at least one indication (i.e., at least one of a plurality of indicia 422, 424 or 426) may be displayed for indicating the availability of the second content for each of the topics 412a-412c displayed on the web page 414. The at least one indication may be displayed to indicate that at least one second content associated with at least one portion of the first content is hidden behind the at least one portion of the first content.

Figure 4C:
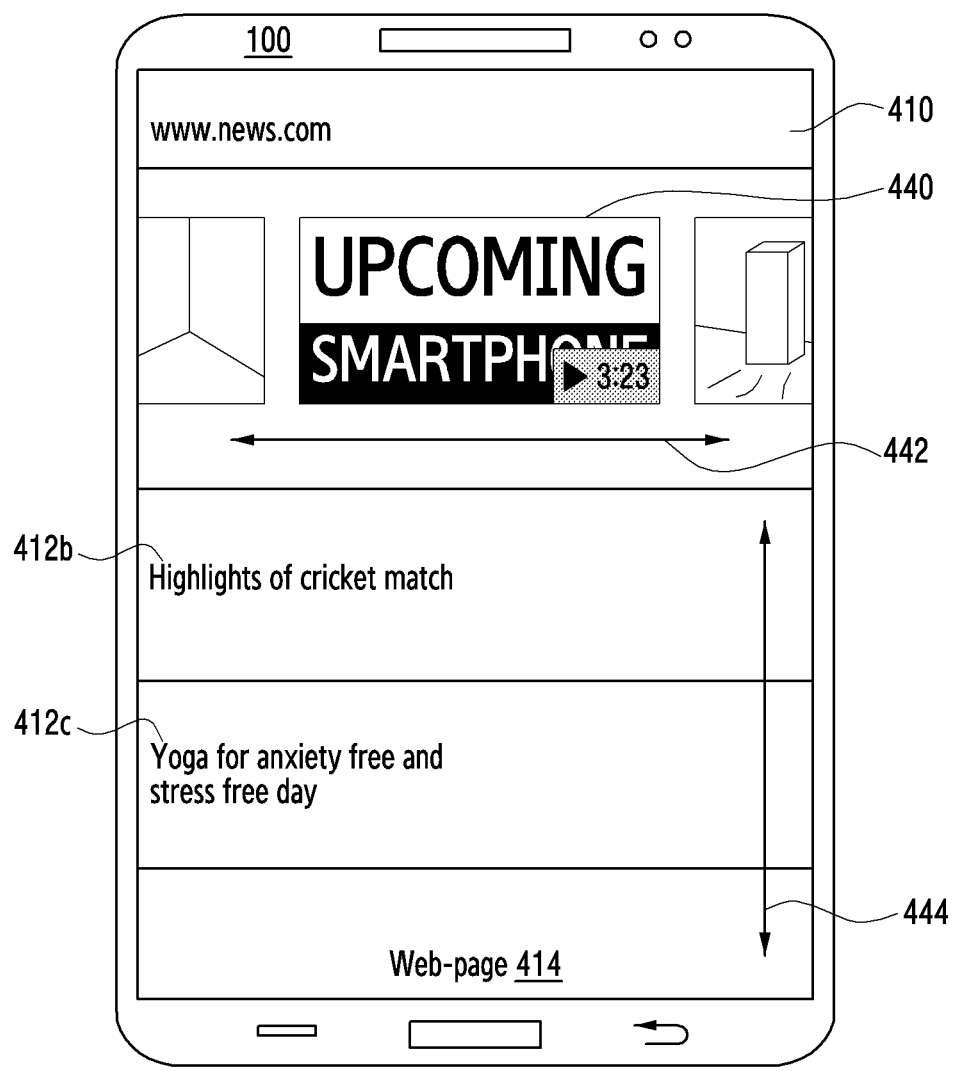

At operation 404, the electronic device 100 may be configured to detect an input selecting a portion of the first content. Referring to FIG. 4A, if no input is detected for any portion of the first content, operation 402 may be performed. If an input is detected for at least one portion of the first content, operation 406 may be performed. Referring to FIGS. 4B and 4C, if the indicia 422 is displayed near the topic 412a, the user may perform a gesture 428 on the topic 412a to indicate selection thereof with respect to the first content. The gesture 428 may be detected by the electronic device 100 as the input to switch to the screen displaying the at least one second content comprising a video content 440 associated with the topic 412a. According to various embodiments of the disclosure, the gesture 428 includes a pinch-in gesture, a pinch-out action, a pinch-in action, a swipe gesture, a tap gesture, a long gesture, and the like.

According to various embodiments of the disclosure, in response to detecting an input corresponding to the gesture for the first content, the electronic device 100 may be configured to display at least one keyword associated with the first content. The electronic device 100 may be configured to detect an input corresponding to an input for one keyword or a combination of a plurality of keywords. In this case, the electronic device 100 may be configured to determine a second content to be displayed on the screen, based on at least one selected keyword by the gesture.

At operation 406, the electronic device 100 may be configured to determine the second content related to the portion of the first content. According to various embodiments of the disclosure, the electronic device 100 may be configured to determine the second content based on semantics of the portion of the first content. Referring to FIGS. 4B and 4C, the electronic device 100 determines the at least one second content comprising the video content 440.

According to an embodiment of the disclosure, the electronic device 100 may be configured to determine to display the second content as ordered in the list received from the apparatus 200. According another embodiment, the electronic device 100 may be further configured to determine the second content to be displayed on the screen, by performing at least one further processing on the list received from the apparatus 200.

At operation 408, the electronic device 100 may be configured to display the second content on the screen where the portion of the first content is displayed. Referring to FIG. 4C, when the at least one second content to be displayed by the electronic device 100 is determined, the video content 440 determined to be most related to the topic 412a is displayed on a portion that the topic 412a is displayed in the web page 414.

Further, according to various embodiments of the disclosure, a scrolling in a first direction 444 to review the other topics 412b-412c on the web page 414 and a scrolling in a second direction 442 to review the second content other than the video content 440 on the same web page 414. According to various embodiments, the first direction 444 and the second direction 442 are substantially perpendicular to each other. In an example, the scrolling in the first direction 444 (e.g., a vertical scrolling) may be to view the other topics 412b-412c displayed on the web page 414 and the scrolling in the second direction 442 (e.g., a horizontal scrolling) may be to view the second content other than the video content 440. In this case, the second content other than the video content 340 may be provided as URL.

The above descriptions in FIGS. 3A-3C and FIGS. 4A-4C are illustrative and the first content and the second content may be various types of media, according to various embodiments of the disclosure.

Figure 5:
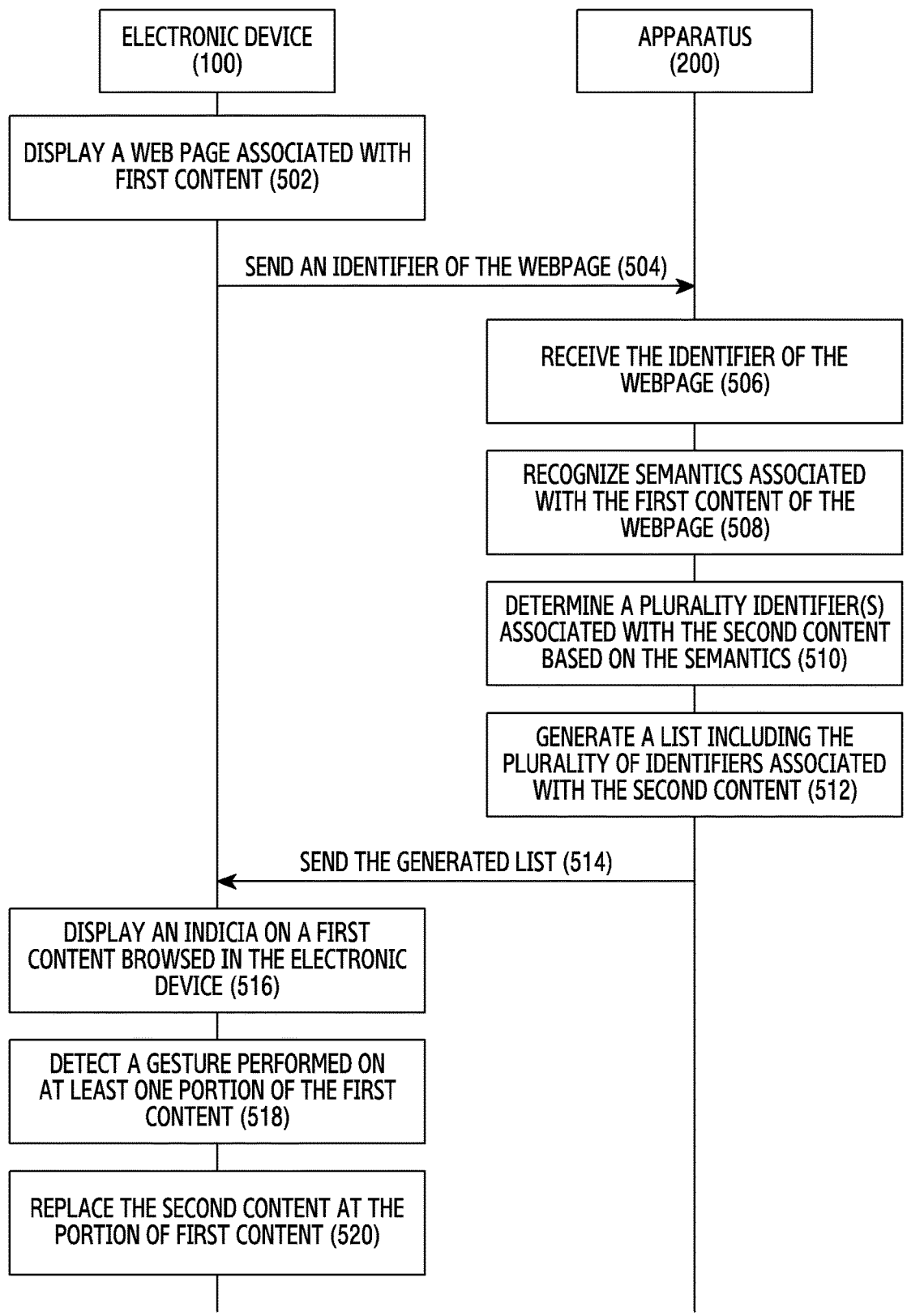
FIG. 5 is a sequence diagram illustrating various instructions communicated between the electronic device and the apparatus for managing navigation of web content, according to an embodiment.

FIG. 5 is a sequence diagram illustrating various instructions communicated between the electronic device 100 and the apparatus 200 for managing navigation of web content, according to an embodiment.

In conjunction with the FIGS. 1 and 2, the electronic device 100 is configured to communicate with the apparatus 200 either directly or through the network.

At operation 502, the electronic device 100 is configured to display a web page associated with the first content. For example, the display 120 of the electronic device 100 may be configured to display the web page associated with the first content.

At operation 504, the electronic device 100 is configured to transmit the identifier of the web page to the apparatus 200. For example, the communicator 170 of the electronic device 100 may be configured to be used for transmitting the identifier of the web page.

At operation 506, the apparatus 200 is configured to receive the identifier of the web page from the electronic device 100. For example, the navigation engine 210 of the apparatus 200 may be configured to generate an instruction to receive the identifier.

At operation 508, the apparatus 200 is configured to recognize semantics associated with the first content. For example, the navigation engine 210 of the apparatus 200 may be configured to generate an instruction to recognize semantics associated with the first content.

At operation 510, the apparatus 200 is configured to determine a plurality of identifier(s) associated with the second content based on the semantics. For example, the navigation engine 210 of the apparatus 200 may be configured to determine the plurality of identifier(s) associated with the second content.

In an embodiment, the navigation engine 210 is configured to determine predefined identifiers associated with the at least one portion of the first content.

In an embodiment, the navigation engine 210 is configured to generate the index of web pages associated with the at least one identifier of the second content, wherein the index comprises the predefined identifiers and the at least one identifier for the second content.

At operation 512, the apparatus 200 is configured to generate the list based on the index of web pages associated with the identifier of the second content. For example, the navigation engine 210 of the apparatus 200 may be configured to generate an instruction to generate the list.

At operation 514, the apparatus 200 is configured to transmit the generated list to the electronic device 100. For example, the navigation engine 210 of the apparatus 200 may be configured to generate an instruction to transmit the generated list. Moreover, for example, the communicator 240 of the apparatus 200 may be configured to be used for transmitting the generated list.

At operation 516, in response to receiving the generated list from the apparatus 200, the electronic device 100 is configured to provide the indicia on the first content which is displayed on the display 120. For example, the navigation engine 140 of the electronic device 100 may be configured to provide the indicia on the first content.

At operation 518, the electronic device 100 is configured to detect the gesture performed on at least one portion of the first content. For example, the navigation engine 140 of the electronic device 100 may be configured to generate an instruction to detect the gesture. In an embodiment, the user performs the gesture on the first content, and the indicia is provided on the first content. According to various embodiments of the disclosure, in response to detecting an input corresponding to the gesture for the first content, the electronic device 100 may be configured to display at least one keyword associated with the first content. The electronic device 100 may be configured to detect an input corresponding to an input for one keyword or a combination of a plurality of keywords. In this case, the electronic device 100 may be configured to determine a second content to be displayed on the screen, based on at least one keyword selected by the gesture.

At operation 520, the electronic device 100 is configured to display the second content on the screen where the portion of first content is displayed. For example, the display 120 of the electronic device 100 may be configured to display the second content. According to another embodiment of the disclosure, the electronic device 100 may be configured to display the second content on the screen where the first content is displayed in replacement of the first content.

According to an embodiment of the disclosure, the electronic device 100 may be configured to display the second content as ordered in the list received from the apparatus 200. According another embodiment, the electronic device 100 may be further configured to determine the second content to be displayed on the screen, by performing at least one further processing on the list received from the apparatus 200. In one example, the electronic device 100 may be configured to modify the order of the second content included in the list received from the apparatus 200, based on the semantics of the at least one selected keyword. In another example, the electronic device 100 may be configured to modify the order of the second content included in the list received from the apparatus 200, based on information related to a usage of the electronic device 100.

Figure 6A:
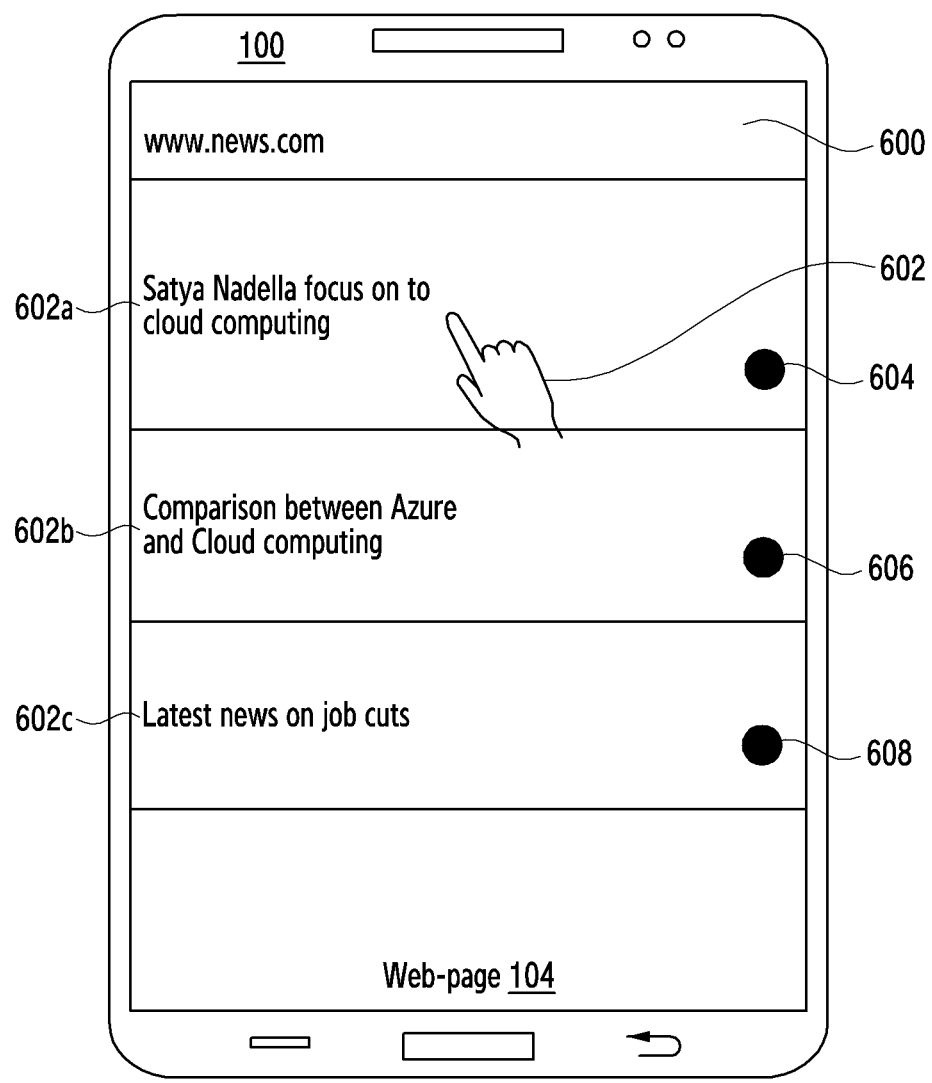
FIGS. 6A, 6B, and 6C illustrate an example scenario in which a portion of a first content is replaced with the second content, according to an embodiment.
Figure 6B:
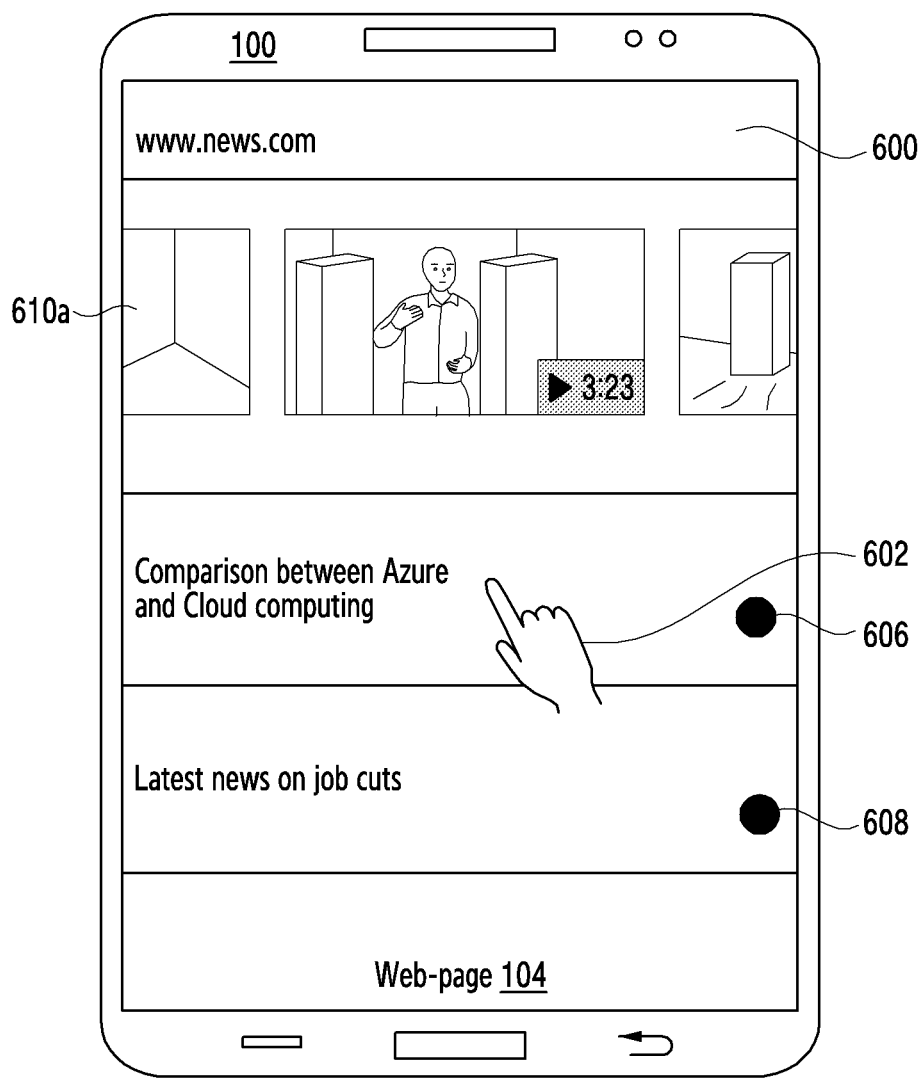
Figure 6C:
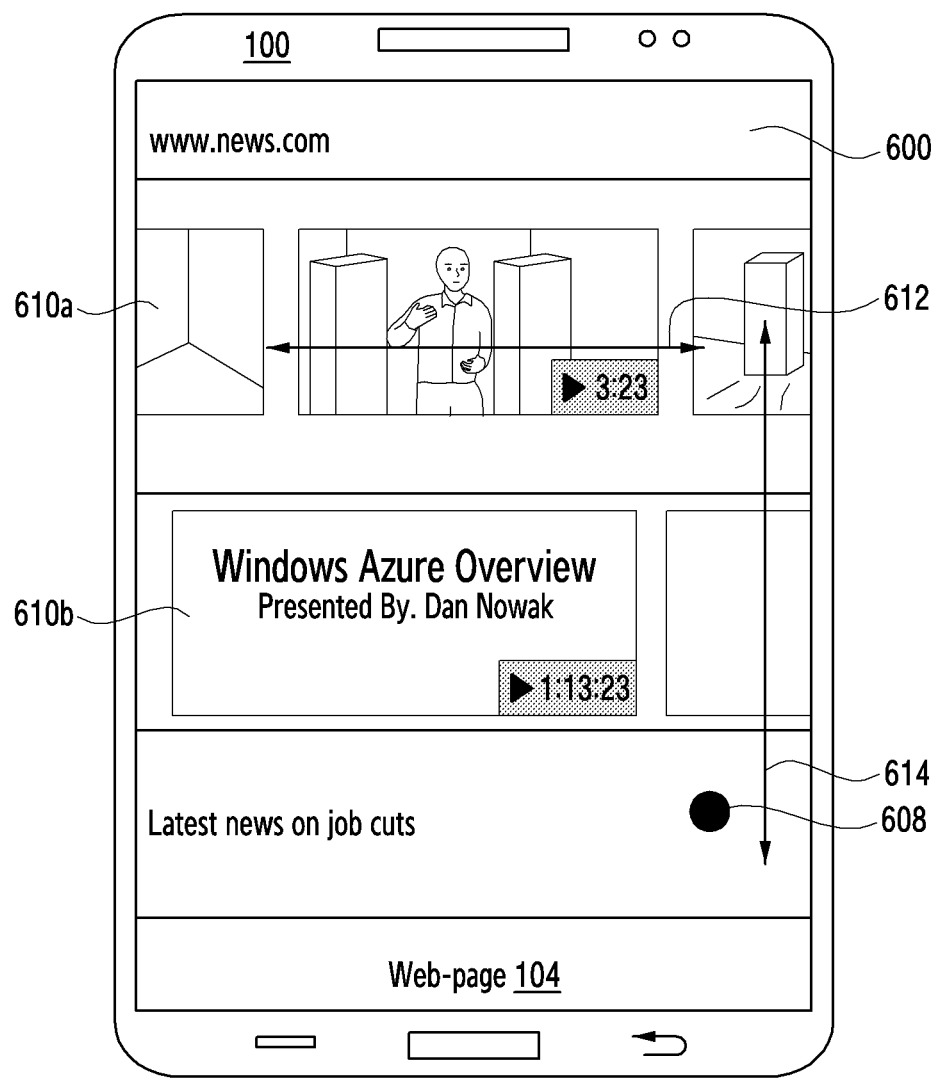

FIGS. 6A, 6B, and 6C illustrate an example scenario in which the portion of the first content is replaced with the second content, according to an embodiment.

Referring to FIG. 6A, news highlights (i.e., the first content) are displayed on the screen of the electronic device 100. The news highlights are presented on the web page 104 of the electronic device 100 as below:

Topic 602a: Satya Nadella focus shift on to cloud computing

Topic 602b: Comparison between Azure and Cloud computing

Topic 602c: Latest news on job cuts

When the web page 104 is loaded on the electronic device 100, the electronic device 100 (e.g., the application controller 110) may be configured to transmit the request to the apparatus 200, and the request comprises the identifier of the web page 104. In response to receiving the request, the apparatus 200 generates and provides the list to the electronic device 100, the list including the plurality of identifiers associated with the plurality of the second content 610a-610b related to the first content (e.g., topics 602a-602c) in the web page 104.

After receiving the list from the apparatus 200, the electronic device 100 may be configured to respectively provide the indicia 604-608 for the plurality of the topics 602a-602c in the web page 104, the indicia 604-608 indicating the availability of the second content 610a-610b for the plurality of topics 604-608.

As shown in the FIG. 6A, the electronic device 100 may be configured to detect the gesture 602 selecting the topic 602a. In response to the detected gesture 602, the second content 610a related to the topic 602a is relayed and displayed on the topic 602a along with the remaining topics 602b and 602c in the web page 104 as shown in FIG. 6B. According to various embodiments of the disclosure, in response to detecting an input corresponding to the gesture for the first content, the electronic device 100 may be configured to display at least one keyword associated with the first content. The electronic device 100 may be configured to detect an input corresponding to an input for one keyword or a combination of a plurality of keywords. In this case, the electronic device 100 may be configured to determine a second content to be displayed on the screen, based on at least one selected keyword by the gesture.

For example, if the topic 602a is related to 'Satya Nadella focus on cloud computing,' the apparatus 200 can be configured to provide the list comprising the URL of the second content 610a that includes videos about Satya Nadella talks on cloud computing strategy. Further, the list also comprises the related URL's of the second content 610a.

Further, as shown in the FIG. 6B, the electronic device 100 may be configured to detect the gesture 602 selecting the topic 602b. In response to the detected gesture 602 at the topic 602b, the second content 610b related to the topic 602b is relayed (e.g., overlaid on the topic 602b or overlaid only on the selected portion of the first content) and displayed on the topic 602b along with the remaining topics (i.e., 602c) in the web page 104 as shown in the FIG. 6C. In this case, the second content other than the content to be determined most associated with the topic 602b may be provided as URL.

As shown in the FIG. 6C, unlike to conventional methods and conventional systems, the proposed method can allow the user to view the list of second contents for each of the first topic 610a and the second topic 610b by swiping in the second direction 612 (e.g., a horizontal swiping) and can view other topics 602c on the web page by swiping in the first direction 614 (e.g., a vertical swiping). This results in assisting the user to learn about the topic 602a and topic 602b, by viewing the related second content 610a and 610b for each of the interested topics 602a and 602b in the same web page 104.

Figure 7A:
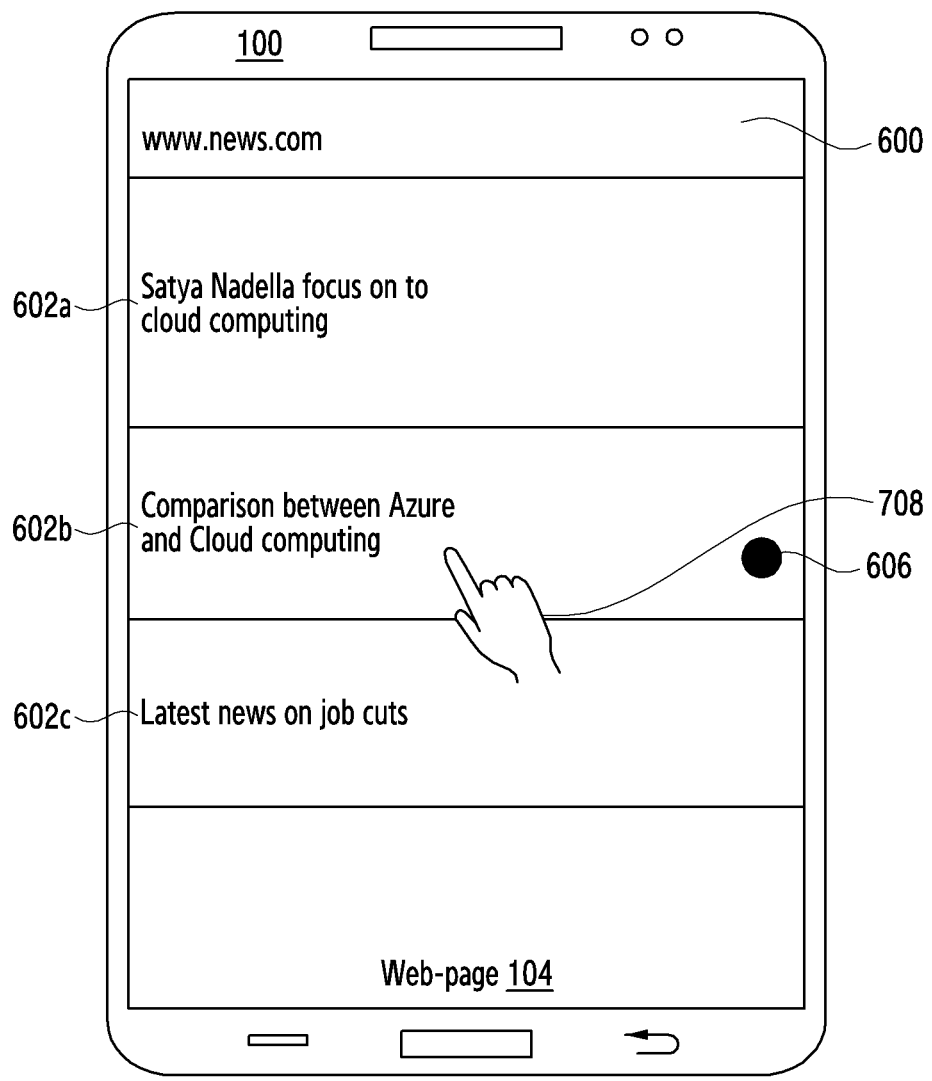
FIGS. 7A and 7B illustrate an example scenario in which a primary content associated with the first content and a secondary content related with the primary content is replaced on the portion of the first content, according to an embodiment.
Figure 7B:
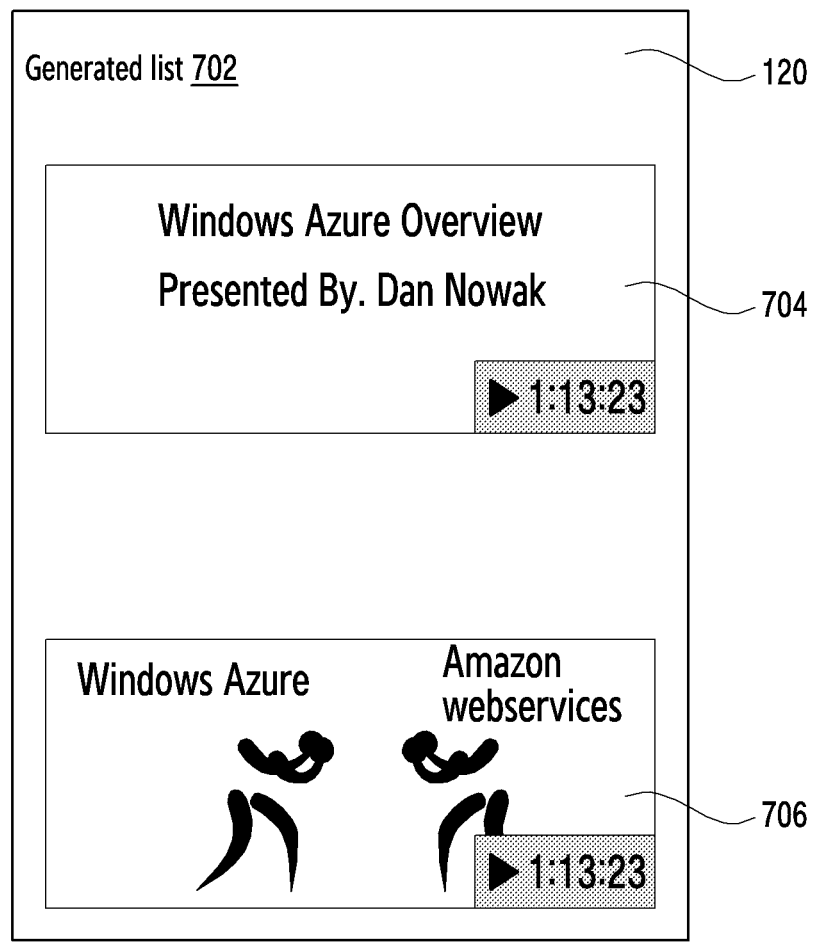

FIGS. 7A and 7B illustrate an example scenario in which a primary content associated with the first content and the secondary content related with the primary content is replaced on the portion of the first content, according to an embodiment.

In conjunction with the FIG. 6B, the electronic device 100 can be configured to detect the gesture 708 on the first content (e.g., topic 602b). Based on the detected gesture 708, the semantic analyzer engine 200h can be configured to detect the predefined identifiers associated with the at least one portion of the topic 602b.

Further, the semantic analyzer engine 200h is configured to recognize the semantics associated with the topic 602b. In an embodiment, the semantic analyzer engine 200h can be configured to determine the semantics associated with the first content (i.e., the topic 602b) from the plurality of content providers. In an example, the gesture 708 is detected at the topic 602b (i.e., Comparison between Azure and Cloud computing). The topic 602b is related to the educational class then, the semantic analyzer engine 200h may be configured to determine the semantics associated with topic 602b from the educational sources or the media providers, and then generate the list 702 based on the semantics.

According to various embodiments of the disclosure, in response to detecting an input corresponding to the gesture for the first content, the electronic device 100 may be configured to display at least one keyword associated with the first content. The electronic device 100 may be configured to detect an input corresponding to an input for one keyword or a combination of a plurality of keywords. In this case, the apparatus 200 may be configured to determine the semantics corresponding to at least one selected keyword by the gesture.

Further, the generated list 702 is connected with the electronic device 100 via the network. The display 120 of the electronic device 100 may be configured to display the list 702 including a plurality of second contents 704-706. Thereon, the portion of the topic 602b is replaced with the plurality of second contents 704-706. According another embodiment, the electronic device 100 may be further configured to display the second content determined by performing at least one further processing on the list received from the apparatus 200. In one example, the electronic device 100 may be configured to modify the order of the second content included in the list received from the apparatus 200, based on the semantics of the at least one selected keyword. In another example, the electronic device 100 may be configured to modify the order of the second content included in the list received from the apparatus 200, based on information related to a usage of the electronic device 100.

For example, a first video in the plurality of second contents 704-706 is about "Windows Azure Overview," which is directly related to the topic 602b, and a second video in the list 702 is a follow-up video in the list 702 that is related to "Differences between Windows Azure and Amazon AWS," the second video being related to the first video currently being browsed on the display 120 of the electronic device 100. This results in assisting the user to learn about the topic 602b by viewing the related content list in the same web page 104.

Figure 8A:
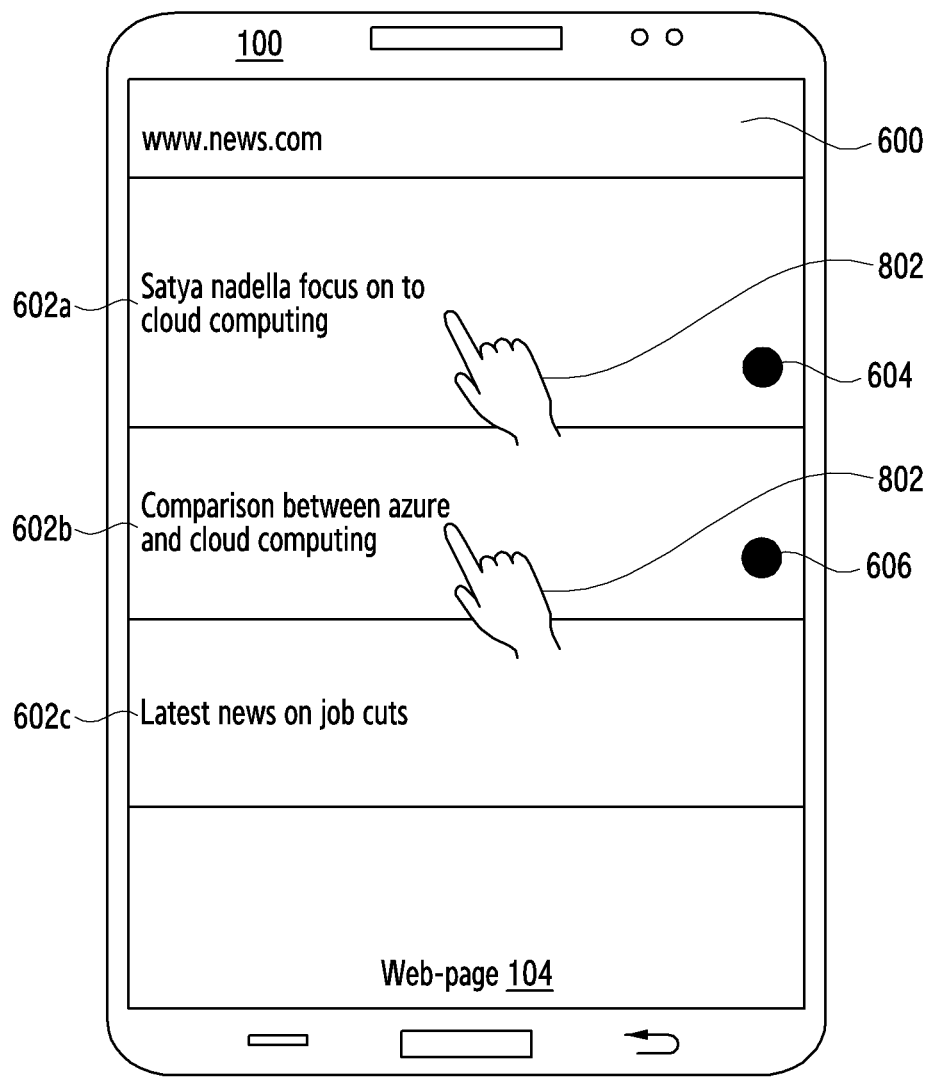
FIGS. 8A, 8B, and 8C illustrate an example scenario in which the user performs the gesture on the at least one second content replaced on the search interface of the browser in order to view a corresponding web page associated with the second content according to an embodiment.
Figure 8B:
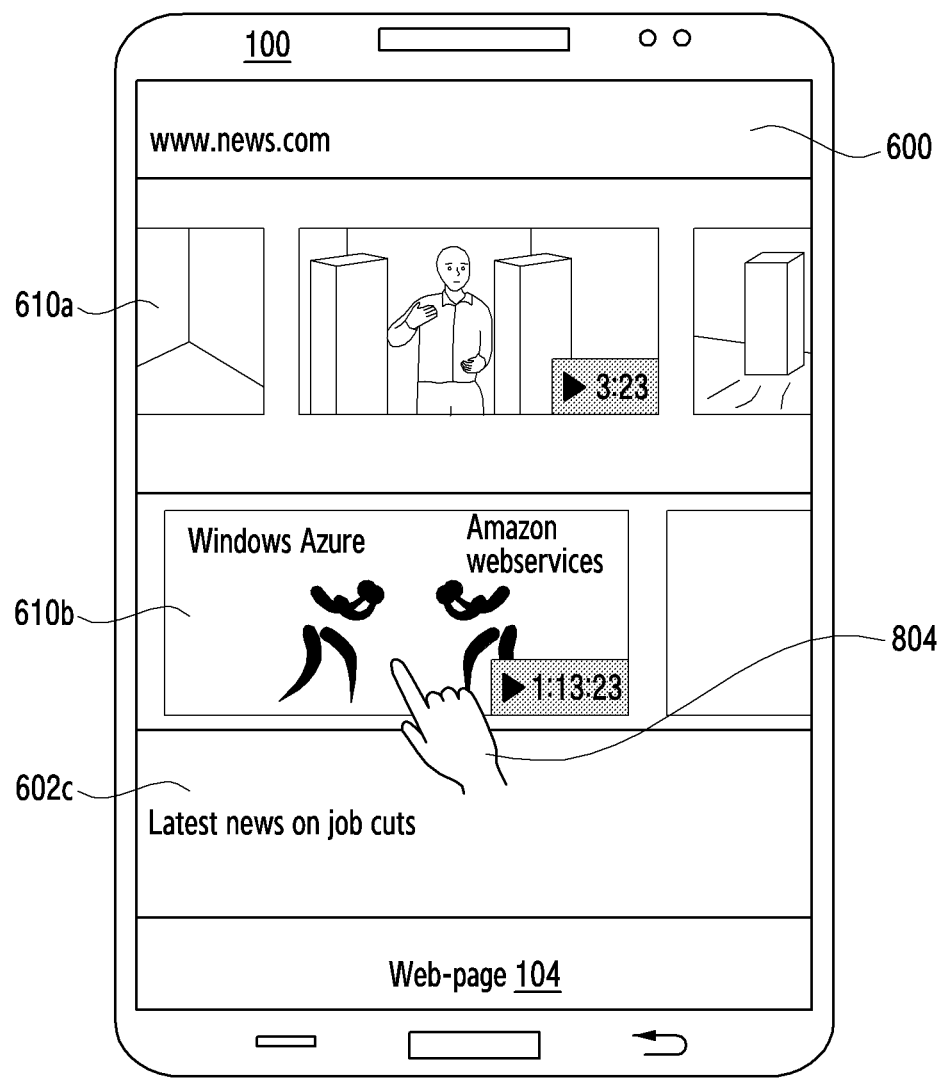
Figure 8C:
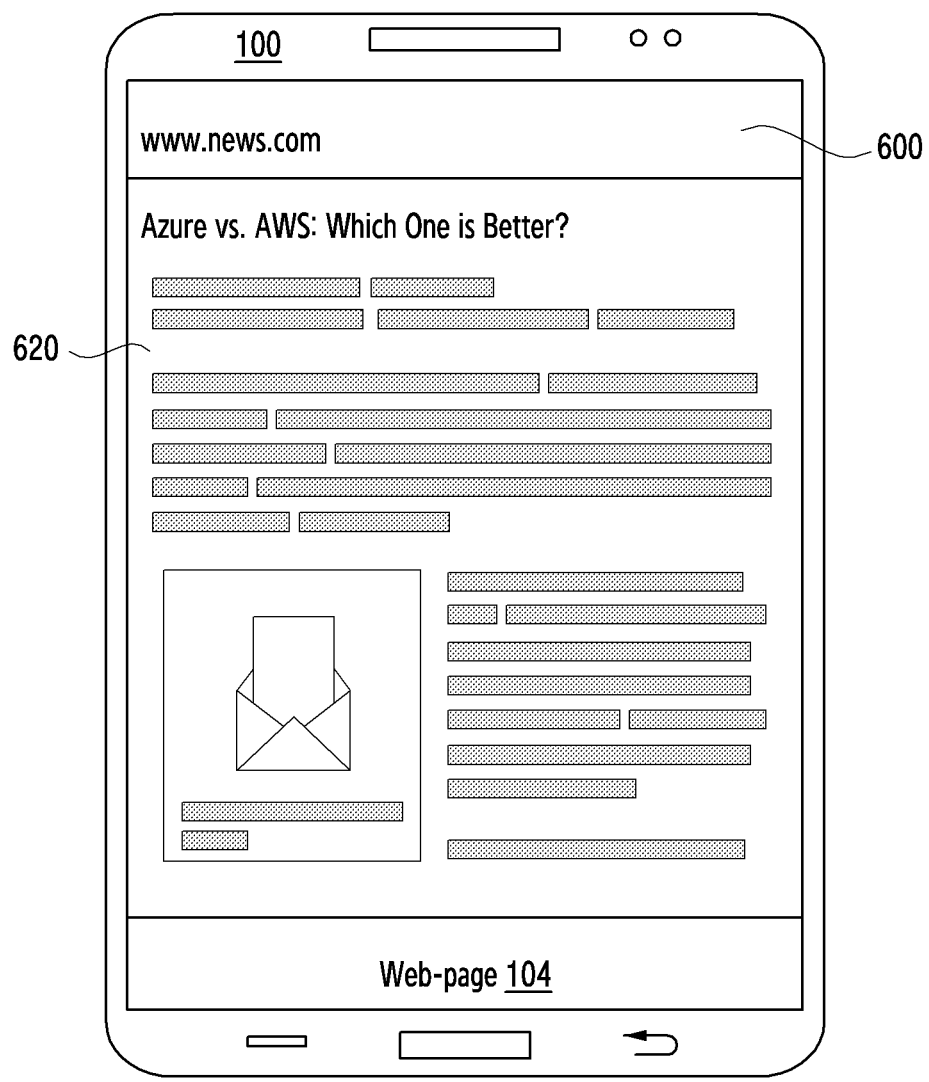

FIGS. 8A, 8B, and 8C illustrate an example scenario in which the user performs a gesture 804 on the at least one second content 610b displayed on the search interface of the browser in order to view a corresponding web page 620 associated with the second content 610b according to an embodiment.

In conjunction with the FIG. 7B, based on received gesture 802 (i.e., pinch out gesture) selecting the topic 602a and the topic 602b, the apparatus 200 may be configured to provide the second content 610a for the topic 602a and the second content 610b for the topic 602b, and the second contents are rendered on the display 120 of the electronic device 100.

The user can view the list of second content 610a by swiping in the second direction and view the remaining topic (i.e., topic 602c) by swiping in the first direction.

Further, if the user performs the gesture 804 (e.g., the pinch in gesture) on the second content 610a-610b, then the web page 104 provides the corresponding content related to the second content 610a-610b within the same web page 104. In another embodiment, if the user performs the gesture 804 selecting the second content 610a-610b, then the topic 602a-602b of the web page 104 is restored (as shown in FIG. 8A).

For example, as shown in the FIG. 8B, the electronic device 100 may be configured to detect that gesture 804 on the second content 610b, and the second content 610b is a video about "Windows Azure vs. Amazon AWS." In response to the detected gesture 804 at the second content 610b, the web page 104 displays the corresponding content 620 related to the second content 610b (i.e., video about "Windows Azure vs. Amazon AWS"). The content 620 is the Wikipedia article titled "Azure vs AWS which is Better?," which is related to the second content 610b (i.e., Windows Azure vs. Amazon AWS). This results in seamless switching between the different content types (e.g., media, document, audio etc.) by performing the gesture on the content currently being browsed on the browser of the electronic device 100.

Figure 9:
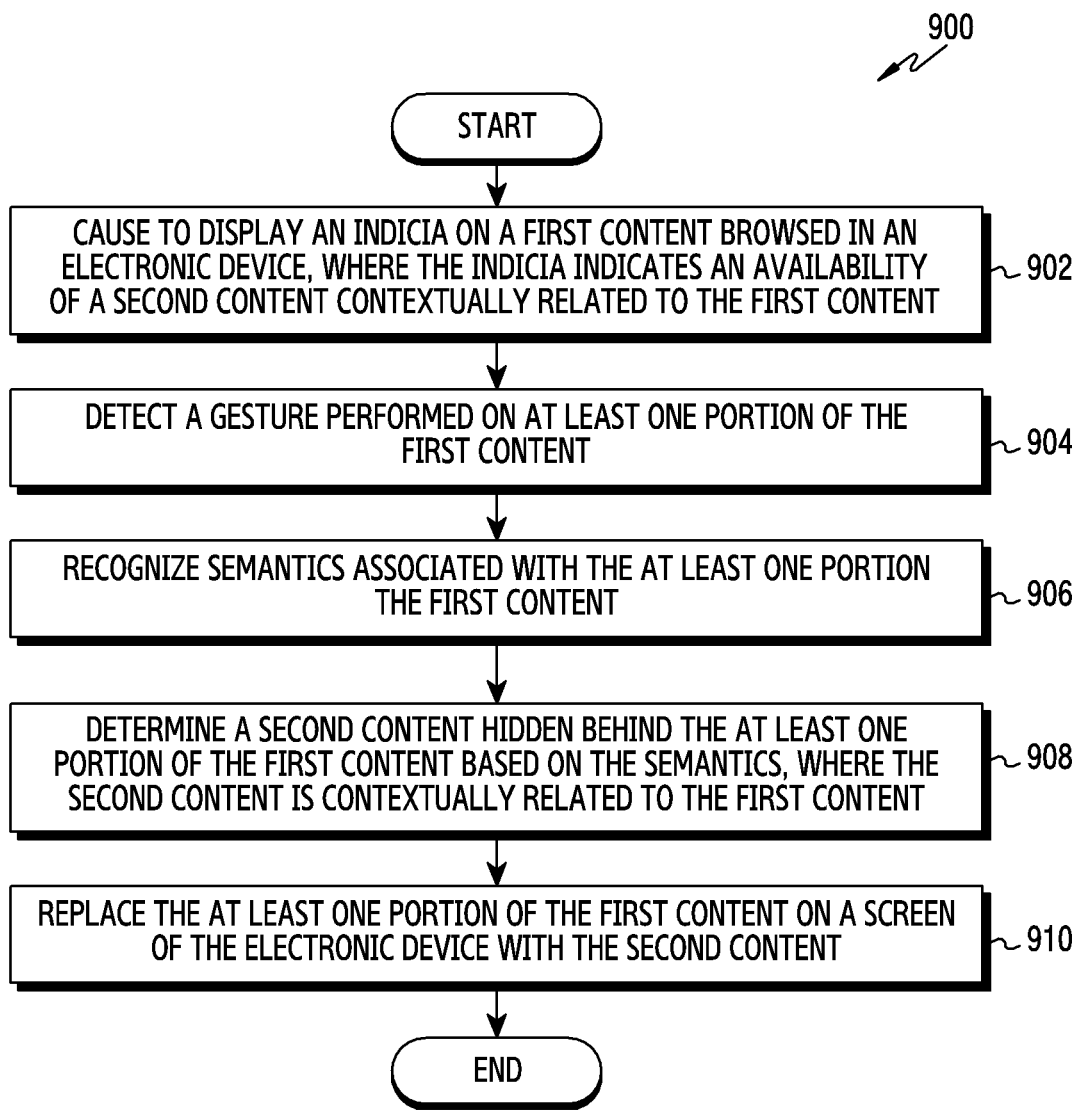
FIG. 9 is a flow chart illustrating a method for managing navigation of web content by the electronic device, according to an embodiment.

FIG. 9 is a flow diagram 900 illustrating a method for managing navigation of web content by the electronic device 100, according to an embodiment.

At operation 902, the electronic device 100 may be configured to display the indicia on the first content browsed in the electronic device 100, the indicia indicating the availability of the second content contextually related to the first content. In an embodiment, the indication engine 140a of the electronic device 100 may be configured to display the indicia on the first content browsed in the electronic device 100.

At operation 904, the electronic device 100 may be configured to detect the gesture performed on at least one portion of the first content displayed on the screen of the electronic device 100. In an embodiment, the gesture recognizer 130 of the electronic device 100 may be configured to detect the gesture performed on at least one portion of the first content displayed on the screen of the electronic device 100. According to various embodiments of the disclosure, in response to detecting an input corresponding to the gesture for the first content, the electronic device 100 may be configured to display at least one keyword associated with the first content. The electronic device 100 may be configured to detect an input corresponding to an input for one keyword or a combination of a plurality of keywords. In this case, the electronic device 100 may be configured to determine a second content to be displayed on the screen, based on at least one keyword selected by the gesture.

At operation 906, the electronic device 100 may be configured to recognize semantics associated with the at least one portion the first content. In an embodiment, the semantic analyzer engine 140c of the electronic device 100 may be configured to recognize semantics associated with the at least one portion the first content. In an embodiment of the disclosure, the electronic device 100 may be configured to recognize the semantics of the at least one selected keyword.

At operation 908, the electronic device 100 may be configured to determine the second content hidden behind the at least one portion of the first content based on the semantics, the second content being contextually related to the first content. In an embodiment, the content recognition engine 140b of the electronic device 100 may be configured to determine the second content hidden behind the at least one portion of the first content based on the semantics, the second content being contextually related to the first content. According another embodiment, the electronic device 100 may be further configured to display the second content determined by performing at least one further processing on the list received from the apparatus 200. In one example, the electronic device 100 may be configured to modify the order of the second content included in the list received from the apparatus 200, based on the semantics of the at least one selected keyword. In another example, the electronic device 100 may be configured to modify the order of the second content included in the list received from the apparatus 200, based on information related to a usage of the electronic device 100.

At operation 910, the electronic device 100 may be configured to replace the at least one portion of the first content on the screen of the electronic device 100 with the second content. In an embodiment, the navigation engine 140 of the electronic device 100 may be configured to replace the at least one portion of the first content on the screen of the electronic device 100 with the second content. In this case, the second content other than the content to be determined most associated with the at least one portion of the first content may be provided as URL.

The various actions, acts, blocks, steps, or the like in FIG. 9 may be performed in the order presented, in a different order or simultaneously. Further, in some embodiments, some of the actions, acts, blocks, steps, or the like may be omitted, added, modified, skipped, or the like without departing from the scope of the invention.

Figure 10A:
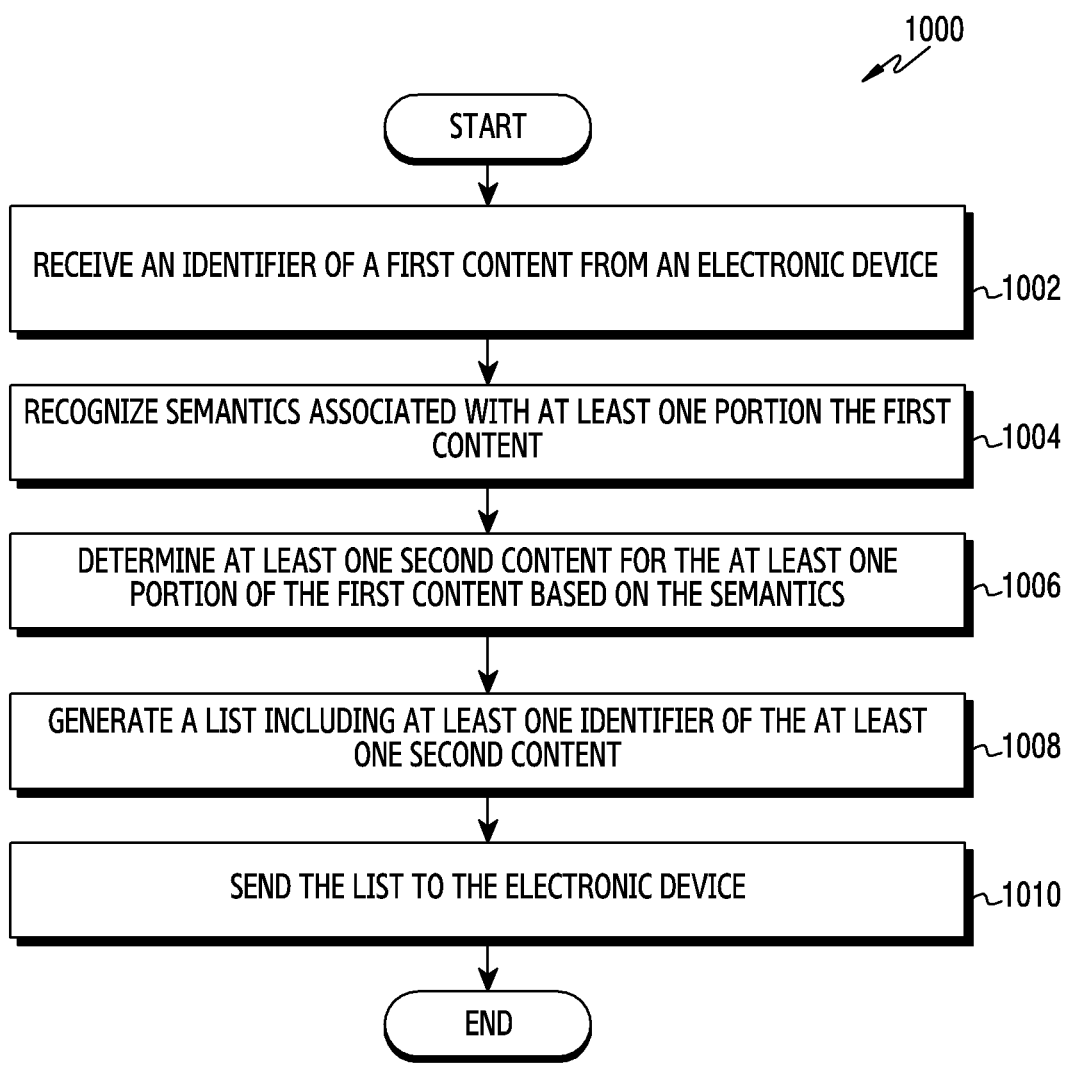
FIG. 10A is a flow chart illustrating a method for managing navigation of web content by the apparatus, according to an embodiment.

FIG. 10A is a flow diagram 1000 illustrating a method for managing navigation of web content by the apparatus 200, according to an embodiment.

At operation 1002, the apparatus 200 may be configured to receive the identifier of the first content from the electronic device 100. In an embodiment, the navigation engine 210 of the apparatus 200 may be configured to receive the identifier of the first content from the electronic device 100.

At operation 1004, the apparatus 200 may be configured to recognize semantics associated with the at least one portion the first content. In an embodiment, the semantic analyzer engine 210*h* of the apparatus 200 may be configured to recognize semantics associated with the at least one portion the first content.

At operation 1006, the apparatus 200 may be configured to determine at least one second content for the at least one portion of the first content based on the semantics. In an embodiment, the navigation engine 210 of the apparatus 200 may be configured to determine the at least one second content for the at least one portion of the first content based on the semantics.

At operation 1008, the apparatus 200 may be configured to generate the list including at least one identifier of the at least one second content. In an embodiment, the navigation engine 210 of the apparatus 200 may be configured to generate the list including at least one identifier of the at least one second content.

At operation 1010, the apparatus 200 may be configured to transmit the list to the electronic device 100. In an embodiment, the navigation engine 210 of the apparatus 200 may be configured to transmit the list to the electronic device 100.

The various actions, acts, blocks, steps, or the like in FIG. 10A may be performed in the order presented, in a different order or simultaneously. Further, in some embodiments, some of the actions, acts, blocks, steps, or the like may be omitted, added, modified, skipped, or the like without departing from the scope of the invention.

Figure 10B:
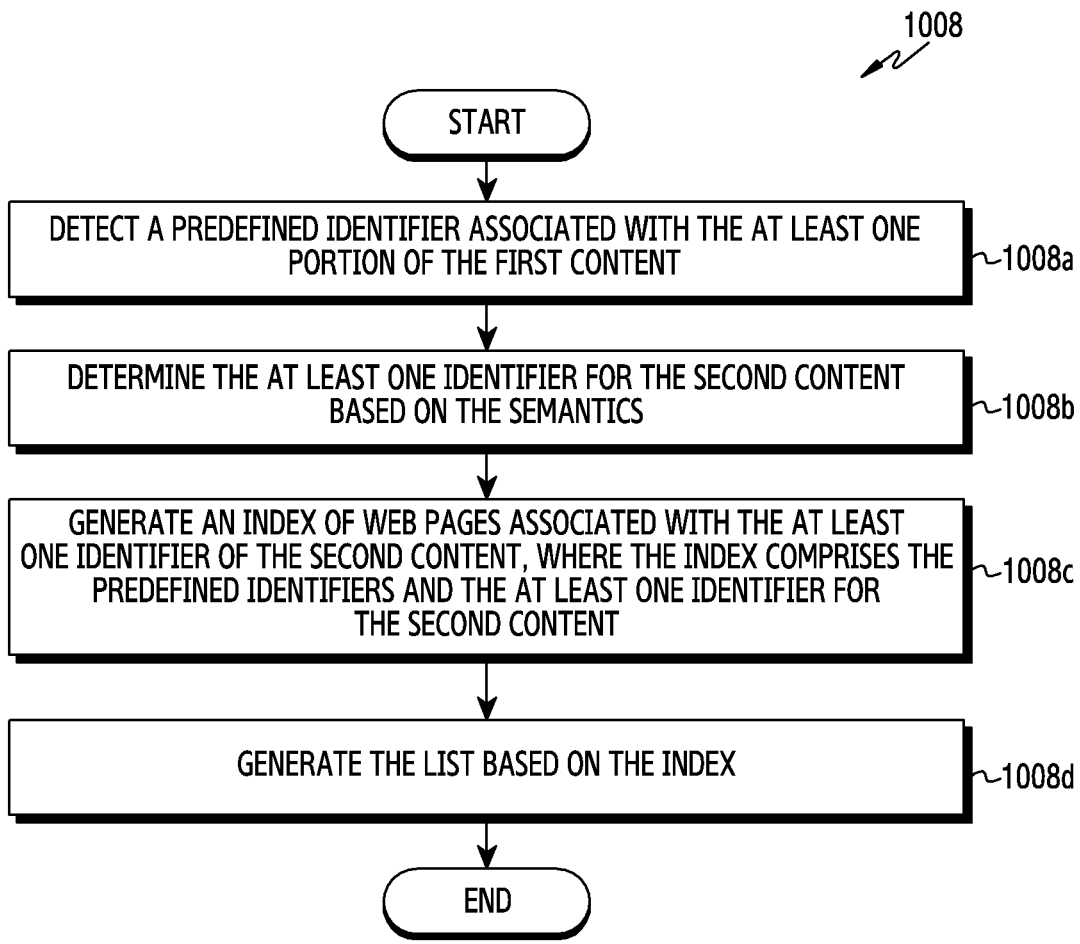
FIG. 10B is a flow chart illustrating a method for generating a list by the apparatus, according to an embodiment.

FIG. 10B is a flow diagram 1008 illustrating a method for generating the list by the apparatus 200, according to an embodiment.

At operation 1008*a*, the apparatus 200 may be configured to detect predefined identifiers associated with the at least one portion of the first content. In an embodiment, the navigation engine 210 of the apparatus 200 may be configured to detect the predefined identifiers associated with the at least one portion of the first content.

At operation 1008*b*, the apparatus 200 may be configured to determine the at least one identifier for the second content based on the semantics. In an embodiment, the navigation engine 210 of the apparatus 200 may be configured to determine the at least one identifier for the second content based on the semantics.

At operation 1008*c*, the apparatus 200 may be configured to generate an index of web pages associated with the at least one identifier of the second content, the index including the predefined identifiers and the at least one identifier for the second content. In an embodiment, the navigation engine 210 of the apparatus 200 may be configured to generate the index of web pages associated with the at least one identifier of the second content, the index including the predefined identifiers and the at least one identifier for the second content.

At operation 1008*d*, the apparatus 200 may be configured to generate the list based on the index. In an embodiment, the navigation engine 210 of the apparatus 200 may be configured to generate the list based on the index.

The various actions, acts, blocks, steps, or the like in FIG. 10B may be performed in the order presented, in a different order or simultaneously. Further, in some embodiments, some of the actions, acts, blocks, steps, or the like may be omitted, added, modified, skipped, or the like without departing from the scope of the invention.

Figure 11:
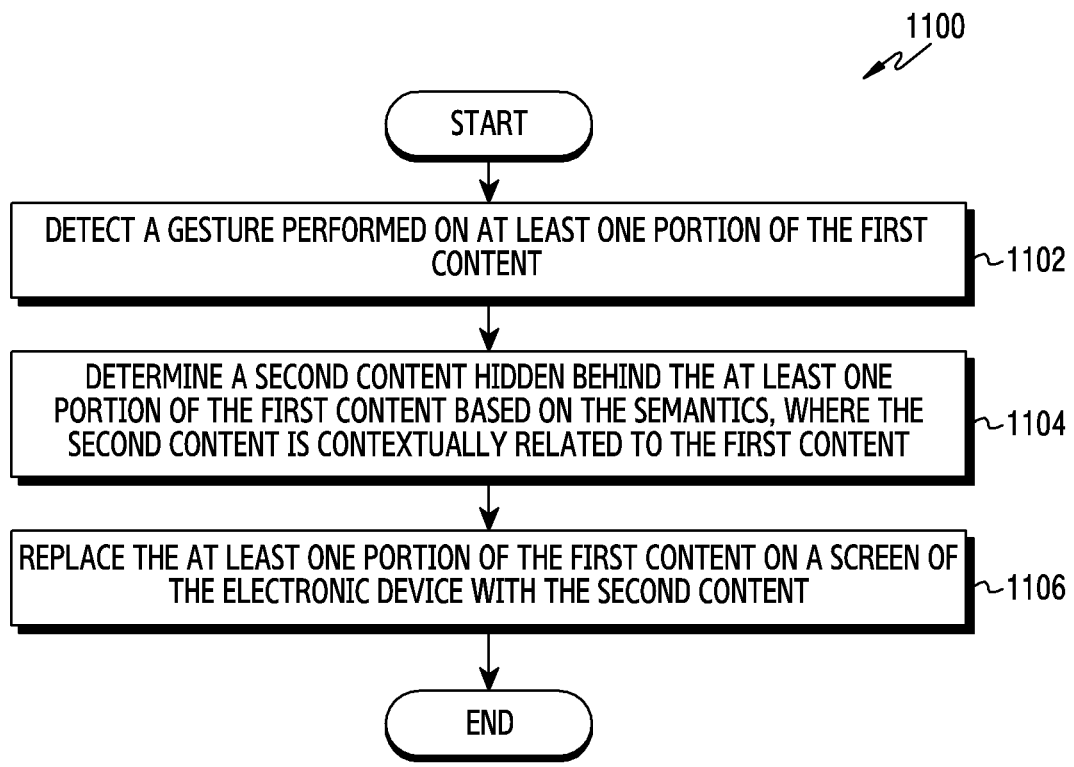
FIG. 11 is a flow chart illustrating a method for managing navigation of web content by the electronic device, according to an embodiment.

FIG. 11 is a flow diagram illustrating a method for managing navigation of web content by the electronic device, according to an embodiment.

At operation 1102, the electronic device 100 may be configured to detect the gesture performed on at least one portion of the first content displayed on the screen of the electronic device 100. In an embodiment, the gesture recognizer 130 of the electronic device 100 may be configured to detect the gesture performed on at least one portion of the first content displayed on the screen of the electronic device 100. According to various embodiments of the disclosure, in response to detecting an input corresponding to the gesture for the first content, the electronic device 100 may be configured to display at least one keyword associated with the first content. The electronic device 100 may be configured to detect an input corresponding to an input for one keyword or a combination of a plurality of keywords. In this case, the electronic device 100 may be configured to determine a second content to be displayed on the screen, based on at least one selected keyword by the gesture.

At operation 1104, the electronic device 100 may be configured to determine the second content hidden behind the at least one portion of the first content based on the semantics, the second content being contextually related to the first content. In an embodiment, the content recognition engine 140*b* of the electronic device 100 may be configured to determine the second content hidden behind the at least one portion of the first content based on the semantics, the second content being contextually related to the first content. In another embodiment, the second content can be contextually related to the at least one portion of the first content. According to an embodiment of the disclosure, the electronic device 100 may be configured to display the second content as ordered in the list received from the apparatus 200. According another embodiment, the electronic device 100 may be further configured to determine the second content to be displayed on the screen, by performing at least one further processing on the list received from the apparatus 200. In one example, the electronic device 100 may be configured to modify the order of the second content included in the list received from the apparatus 200, based on the semantics of the at least one selected keyword. In another example, the electronic device 100 may be configured to modify the order of the second content included in the list received from the apparatus 200, based on information related to a usage of the electronic device 100.

At operation 1106, the electronic device 100 may be configured to replace the at least one portion of the first content on the screen of the electronic device 100 with the second content. In an embodiment, the navigation engine 140 of the electronic device 100 may be configured to replace the at least one portion of the first content on the screen of the electronic device 100 with the second content. In this case, the second content other than the content to be determined most associated with the at least one portion of the first content may be provided as URL.

The various actions, acts, blocks, steps, or the like in FIG. 11 may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented through at least one software program running on at least one hardware device and performing network management functions to control the elements. The elements shown in the FIG. 1 through 11 include blocks which can be at least one of a hardware device, or a combination of hardware device and software module.

The foregoing description of the specific embodiments will so fully reveal the general nature of the embodiments herein that others can, by applying current knowledge, readily modified or adapted for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for operating an electronic device, the method comprising:
   displaying an indicia on at least one portion of first content on a screen of the electronic device, wherein the indicia indicates whether a second content related to the at least one portion of the first content is hidden behind the at least one portion of the first content;
   detecting a first input selecting the at least one portion of the first content; and
   displaying the second content replacing the at least one of the first content on the screen along with remaining portions of the first content other than the at least one portion of the first content.

2. The method of claim 1, further comprising:
   detecting a second input selecting the second content; and
   displaying the at least one portion of the first content on the screen at a position of the second content.

3. The method of claim 1, wherein the second content is hidden behind the at least one portion of the first content.

4. The method of claim 1, wherein the second content is determined from a list comprising at least one identifier of the second content, and
   wherein the second content related to the at least one portion of the first content is determined by:
   identifying semantics associated with the at least one portion the first content; and
   determining the second content related to the at least one portion of the first content based on the semantics.

5. The method of claim 1, wherein the second content comprises a primary content and a secondary content, wherein the primary content is related to the at least one portion of the first content and the secondary content is related to the primary content.

6. A method for operating an apparatus, the method comprising:
   receiving an identifier of at least one portion of first content from an electronic device;
   determining second content related to the at least one portion of the first content, wherein the second content is hidden behind the at least one portion of the first content, wherein the at least one portion of the first content is to be replaced with the second content on a screen of the electronic device; and
   transmitting, to the electronic device, a list comprising at least one identifier of the second content.

7. The method of claim 6, wherein the determining the second content comprises:
   identifying semantics associated with the at least one portion the first content; and
   determining the second content related to the at least one portion of the first content based on the semantics.

8. The method of claim 7, further comprising:
   detecting pre-defined identifiers associated with the at least one portion of the first content;
   determining the at least one identifier for the second content based on the semantics;
   generating an index of a web page associated with the at least one identifier of the second content, wherein the index comprises the pre-defined identifiers and the at least one identifier for the second content; and
   generating the list based on the index.

9. The method of claim 6, wherein the second content comprises a primary content and a secondary content, wherein the primary content is related to the at least one portion of the first content and the secondary content is related to the primary content.

10. An electronic device, the electronic device comprising:
    a transceiver; and
    at least one processor configured to:
    display an indicia on at least one portion of first content on a screen of the electronic device, wherein the indicia indicates whether a second content related to the at least one portion of the first content is hidden behind the at least one portion of the first content,
    detect a first input selecting the at least one portion of the first content, and
    display the second content replacing the at least one of the first content on the screen along with remaining portions of the first content other than the at least one portion of the first content.

11. The electronic device of claim 10, wherein the at least one processor is further configured to:
    detect a second input selecting the second content; and
    display the at least one portion of the first content on the screen at a position of the second content.

12. The electronic device of claim 10, wherein second content is hidden behind the at least one portion of the first content.

13. The electronic device of claim 10, wherein the second content is determined from a list comprising at least one identifier of the second content, and
    wherein the second content related to the at least one portion of the first content is determined by:
    identifying semantics associated with the at least one portion the first content; and
    determining the second content related to the at least one portion of the first content based on the semantics.

14. The electronic device of claim 10, wherein the second content comprises a primary content and a secondary content, wherein the primary content is related to the at least one portion of the first content and the secondary content is related to the primary content.

15. An apparatus, the apparatus comprising:
   a transceiver; and
   at least one processor configured to:
      receive an identifier of at least one portion of first content from an electronic device,
      determine second content related to the at least one portion of the first content, wherein the second content is hidden behind the at least one portion of the first content, wherein the at least one portion of the first content is to be replaced with the second content on a screen of the electronic device, and
      transmit, to the electronic device, a list comprising at least one identifier of the second content.

16. The apparatus of claim 15, wherein the at least one processor, in order to determine the second content for the at least one portion of the first content, is further configured to:
   identify semantics associated with the at least one portion the first content; and
   determine the second content related to the at least one portion of the first content based on the semantics.

17. The apparatus of claim 16, wherein the at least one processor is further configured to:
   detect pre-defined identifiers associated with the at least one portion of the first content;
   determine the at least one identifier for the second content based on the semantics;
   generate an index of a web page associated with the at least one identifier of the second content, wherein the index comprises the pre-defined identifiers and the at least one identifier for the second content; and
   generate the list based on the index.

18. The apparatus of claim 15, wherein the second content comprises a primary content and a secondary content, wherein the primary content is related to the at least one portion of the first content and the secondary content is related to the primary content.

\* \* \* \* \*